US012393153B2

(12) United States Patent
Hayashida et al.

(10) Patent No.: US 12,393,153 B2
(45) Date of Patent: Aug. 19, 2025

(54) TONER CONTAINER

(71) Applicant: CANON KABUSHIKI KAISHA, Tokyo (JP)

(72) Inventors: Makoto Hayashida, Shizuoka (JP); Yuuki Nakamura, Shizuoka (JP); Go Torii, Kanagawa (JP); Takayuki Yada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 18/204,420

(22) Filed: Jun. 1, 2023

(65) Prior Publication Data

US 2023/0418208 A1 Dec. 28, 2023

(30) Foreign Application Priority Data

Jun. 24, 2022 (JP) ................................ 2022-102266

(51) Int. Cl.
*G03G 21/10* (2006.01)
*G03G 15/01* (2006.01)
(Continued)

(52) U.S. Cl.
CPC ....... *G03G 21/105* (2013.01); *G03G 15/0121* (2013.01); *G03G 15/0822* (2013.01);
(Continued)

(58) Field of Classification Search
CPC ........... G03G 15/0822; G03G 15/0844; G03G 15/0865; G03G 15/0867; G03G 15/0872;
(Continued)

(56) References Cited

U.S. PATENT DOCUMENTS 11,061,366 B2 7/2021 Uesugi
11,487,221 B2 * 11/2022 Okino ............... G03G 15/0877
(Continued)

FOREIGN PATENT DOCUMENTS

JP H05-107918 A 4/1993
JP 2008-158348 A 7/2008
(Continued)

OTHER PUBLICATIONS

Feb. 19, 2024 Extended Search Report in European Patent Application Pub. No. 23 174 487.1.
(Continued)

*Primary Examiner* — Joseph S Wong
(74) *Attorney, Agent, or Firm* — Venable LLP

(57) ABSTRACT

A toner container includes a first chamber for accommodating toner and provided with an outlet port through which the toner is discharged outside of the toner container, a second chamber provided with an inlet port and for accommodating toner to be received from an outside of the toner container through the inlet port, a stirring member for stirring the toner accommodated in the first chamber and to rotate about a rotational axis, and an air supply unit configured to supply air for discharging the toner accommodated in the first chamber to an outside of the toner container through the outlet port. The air supply unit, the first chamber, and the second chamber are aligned in this order in a direction of the rotational axis.

21 Claims, 23 Drawing Sheets

(51) Int. Cl.

| | |
|---|---|
| ***G03G 15/08*** | (2006.01) |
| ***G03G 21/00*** | (2006.01) |
| ***G03G 21/12*** | (2006.01) |
| ***G03G 21/18*** | (2006.01) |
| ***G03G 21/20*** | (2006.01) |

(52) U.S. Cl.
CPC ..... *G03G 15/0844* (2013.01); *G03G 15/0865* (2013.01); *G03G 15/0867* (2013.01); *G03G 15/0872* (2013.01); *G03G 15/0877* (2013.01); *G03G 15/0891* (2013.01); *G03G 15/0896* (2013.01); *G03G 21/0052* (2013.01); *G03G 21/10* (2013.01); *G03G 21/12* (2013.01); *G03G 21/1803* (2013.01); *G03G 21/1814* (2013.01); *G03G 21/1817* (2013.01); *G03G 21/20* (2013.01); *G03G 21/206* (2013.01)

(58) Field of Classification Search
CPC ........... G03G 15/0877; G03G 15/0891; G03G 15/0896; G03G 15/0121; G03G 21/0052; G03G 21/10; G03G 21/105; G03G 21/12; G03G 21/1803; G03G 21/1814; G03G 21/1817; G03G 21/20; G03G 21/206
See application file for complete search history.

(56) References Cited

U.S. PATENT DOCUMENTS

| | | | | |
|---|---|---|---|---|
| 2008/0152379 | A1 | 6/2008 | Saiki et al. | |
| 2008/0292331 | A1 | 11/2008 | Yokomori | |
| 2009/0245851 | A1 | 10/2009 | Hoshi | |
| 2010/0054796 | A1 | 3/2010 | Nakamura | |
| 2010/0054799 | A1 | 3/2010 | Nakamura | |
| 2010/0054804 | A1 | 3/2010 | Uneme | |
| 2011/0076056 | A1 | 3/2011 | Sato | |
| 2011/0103830 | A1 | 5/2011 | Nakamura | |
| 2011/0170903 | A1 | 7/2011 | Hoshi | |
| 2012/0183328 | A1 | 7/2012 | Nakamura | |
| 2012/0315062 | A1 | 12/2012 | Uneme | |
| 2013/0129377 | A1 | 5/2013 | Satomura | |
| 2013/0142541 | A1 | 6/2013 | Hayashida | |
| 2013/0209134 | A1* | 8/2013 | Okino | G03G 15/0877 399/258 |
| 2014/0064776 | A1 | 3/2014 | Yamasaki | |
| 2014/0140723 | A1 | 5/2014 | Hoshi | |
| 2014/0212181 | A1 | 7/2014 | Nakamura | |
| 2014/0376968 | A1* | 12/2014 | Yamamoto | G03G 15/0867 399/258 |
| 2015/0010320 | A1 | 1/2015 | Komatsu | |
| 2015/0234325 | A1 | 8/2015 | Satomura | |
| 2015/0355576 | A1 | 12/2015 | Yamasaki | |
| 2016/0070207 | A1 | 3/2016 | Yada | |
| 2016/0252877 | A1 | 9/2016 | Nakamura | |
| 2017/0003645 | A1 | 1/2017 | Kawakami | |
| 2017/0205764 | A1 | 7/2017 | Torii | |
| 2017/0248909 | A1 | 8/2017 | Nakamura | |
| 2017/0351214 | A1 | 12/2017 | Uesugi | |
| 2018/0039226 | A1 | 2/2018 | Takeuchi | |
| 2019/0204779 | A1 | 7/2019 | Takeuchi | |
| 2020/0033791 | A1 | 1/2020 | Uesugi | |
| 2020/0033792 | A1 | 1/2020 | Uesugi | |
| 2020/0033793 | A1 | 1/2020 | Uesugi | |
| 2020/0033794 | A1 | 1/2020 | Uesugi | |
| 2020/0033795 | A1 | 1/2020 | Uesugi | |
| 2020/0033796 | A1 | 1/2020 | Uesugi | |
| 2020/0033797 | A1 | 1/2020 | Uesugi | |
| 2020/0033798 | A1 | 1/2020 | Uesugi | |
| 2020/0033799 | A1 | 1/2020 | Uesugi | |
| 2020/0041954 | A1 | 2/2020 | Uesugi | |
| 2020/0073323 | A1 | 3/2020 | Uesugi | |
| 2020/0073324 | A1 | 3/2020 | Uesugi | |
| 2020/0174422 | A1 | 6/2020 | Takeuchi | |
| 2020/0272087 | A1 | 8/2020 | Sueshige | |
| 2020/0272088 | A1 | 8/2020 | Sueshige | |
| 2020/0348616 | A1 | 11/2020 | Murakami et al. | |
| 2021/0137460 | A1 | 5/2021 | Kohler et al. | |
| 2021/0216034 | A1 | 7/2021 | Sueshige | |
| 2022/0066385 | A1 | 3/2022 | Uesugi | |
| 2022/0283535 | A1 | 9/2022 | Sueshige | |
| 2023/0032591 | A1 | 2/2023 | Murakami | |

FOREIGN PATENT DOCUMENTS

| | | | |
|---|---|---|---|
| JP | 2011-075887 | A | 4/2011 |
| JP | 2018-189813 | A | 11/2018 |
| JP | 2021-189269 | A | 12/2021 |

OTHER PUBLICATIONS

Co-pending U.S. Appl. No. 18/207,736, filed Jun. 9, 2023.
Co-pending U.S. Appl. No. 18/208,405, filed Jun. 12, 2023.
Co-pending U.S. Appl. No. 18/210,147, filed Jun. 15, 2023.
Co-pending U.S. Appl. No. 18/210,152, filed Jun. 15, 2023.
Co-pending U.S. Appl. No. 18/213,383, filed Jun. 23, 2023.
Co-pending U.S. Appl. No. 18/229,722, filed Aug. 3, 2023.

* cited by examiner (a)

(b)

(a)

(b)

TONER CONTAINER

FIELD OF THE INVENTION AND RELATED ART

The present invention relates to a toner container in which toner is accommodated and an image forming apparatus for forming an image on a recording material.

In an image forming apparatus of an electrophotographic type, a toner cartridge (toner container) which accommodates toner used as a developer in an electrophotographic process and which is detachably mountable to a main assembly of the image forming apparatus is used. In Japanese Laid-Open Patent Application Nos. Hei 5-107918, 2008-158348, and 2011-075887, a toner cartridge (toner container) including a toner accommodating portion for accommodating the toner for being supplied to a developer carrying image and a residual toner (waste toner) accommodating portion for collecting residual toner (waste toner) is disclosed.

SUMMARY OF THE INVENTION

According to an aspect of the present invention, there is provided a toner container comprising: a first chamber configured to accommodate toner and provided with an outlet port through which the toner is discharged outside of the toner container; a second chamber provided with an inlet port and configured to accommodate toner to be received from outside of the toner container through the inlet port; a stirring member configured to stir the toner accommodated in the first chamber and to rotate about a rotational axis; and an air supply unit configured to supply air for discharging the toner accommodated in the first chamber to outside of the toner container through the outlet port, wherein the air supply unit, the first chamber, and the second chamber are aligned in this order in a direction of the rotational axis.

Further features of the present invention will become apparent from the following description of exemplary embodiments with reference to the attached drawings.

Figure 9:
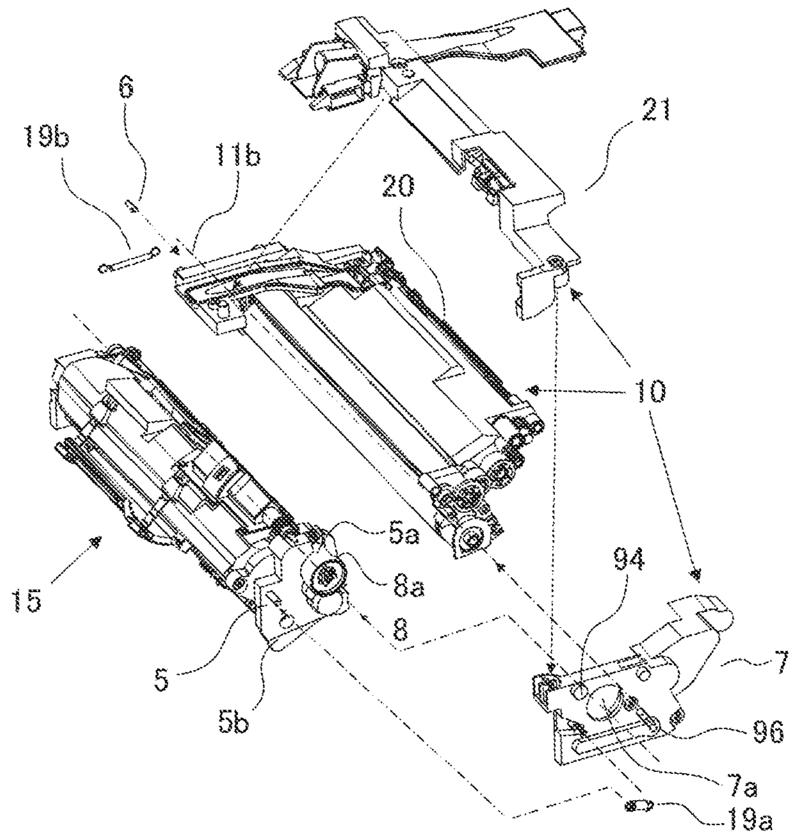
Figure 9:
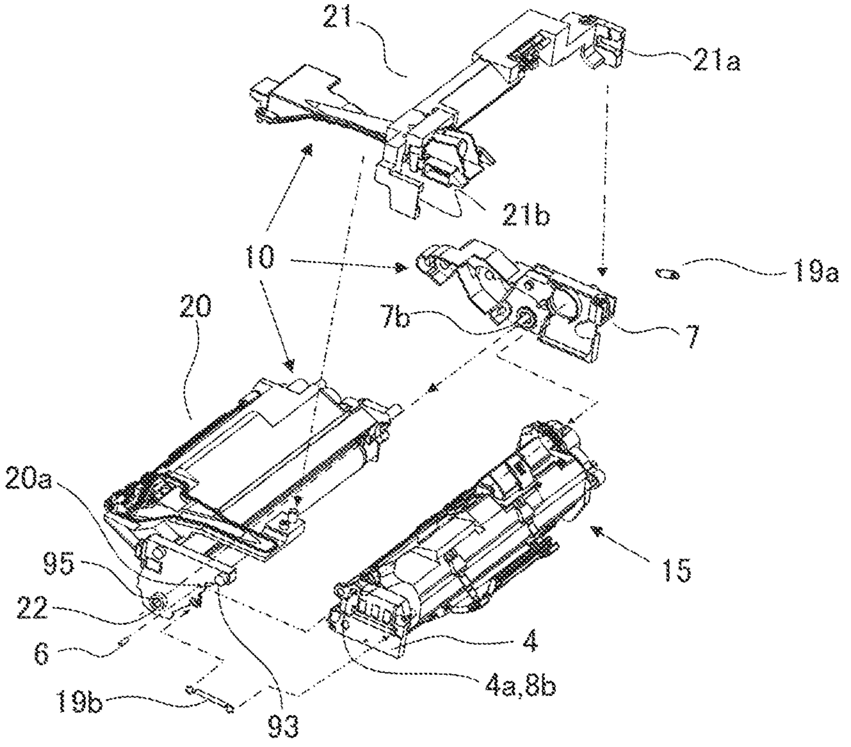

Parts (a) and (b) of FIG. 9 are exploded views of the process cartridge according to the embodiment.

Figure 10:
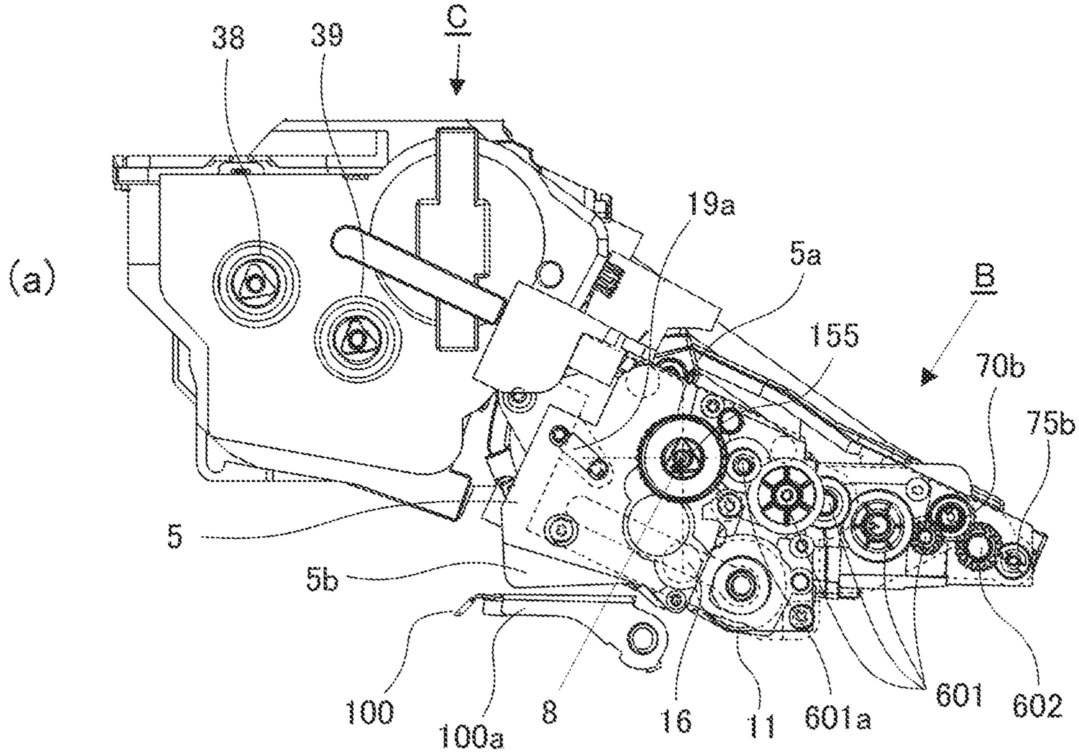
Figure 10:
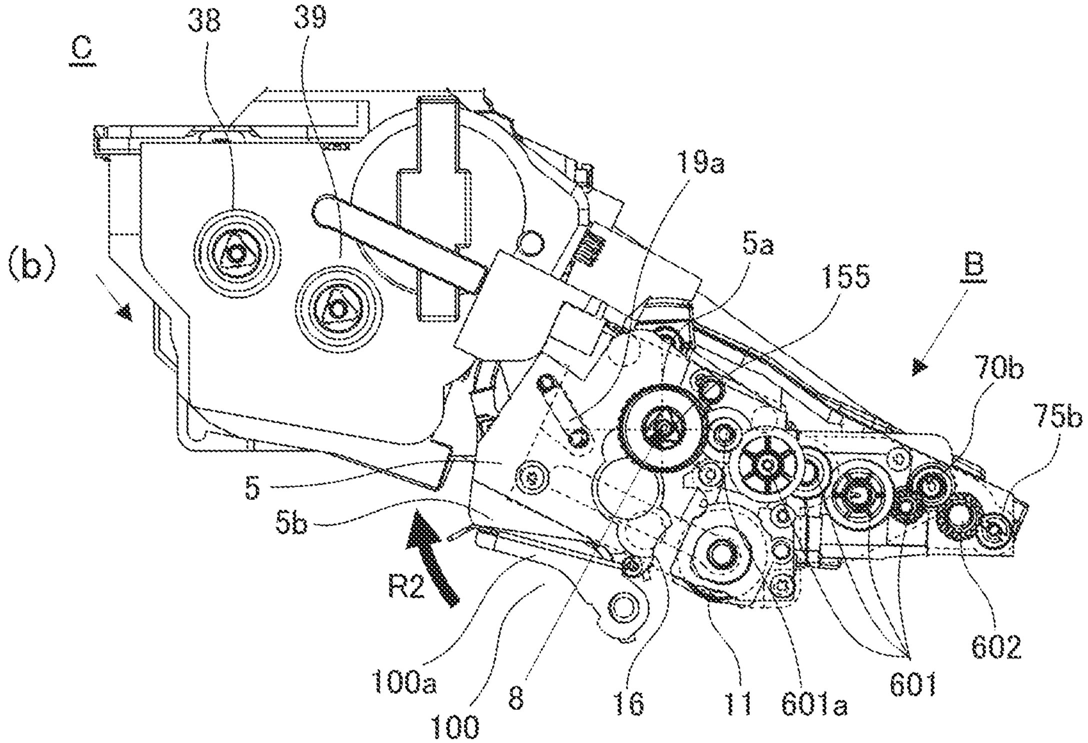

Parts (a) and (b) of FIG. 10 are side views for illustrating mounting of the process cartridge and the toner container according to the embodiment into an apparatus main assembly.

Figure 11:
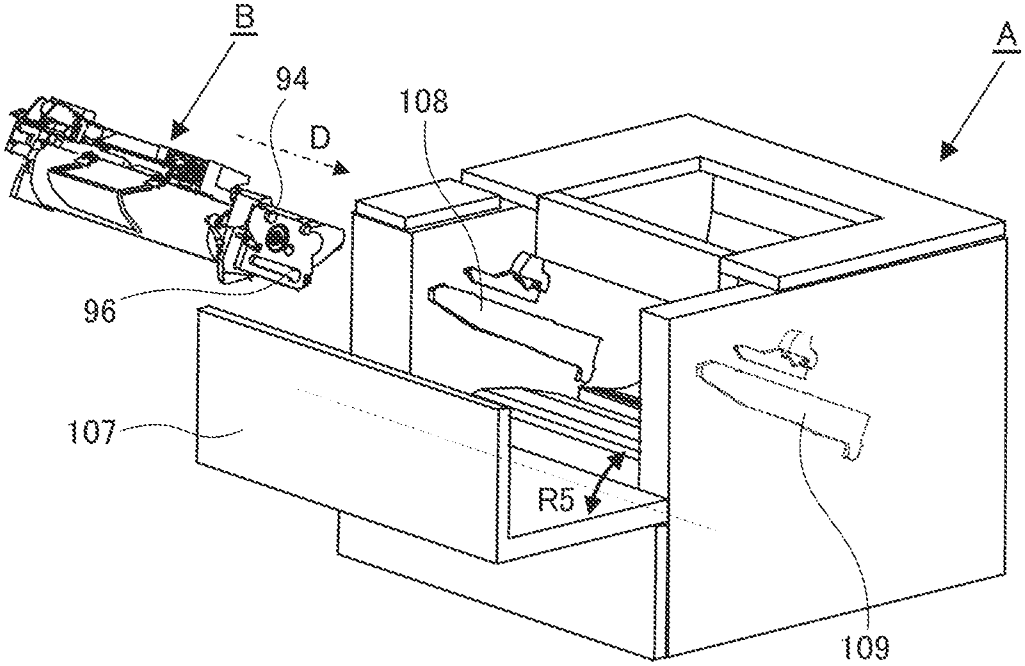
Figure 11:
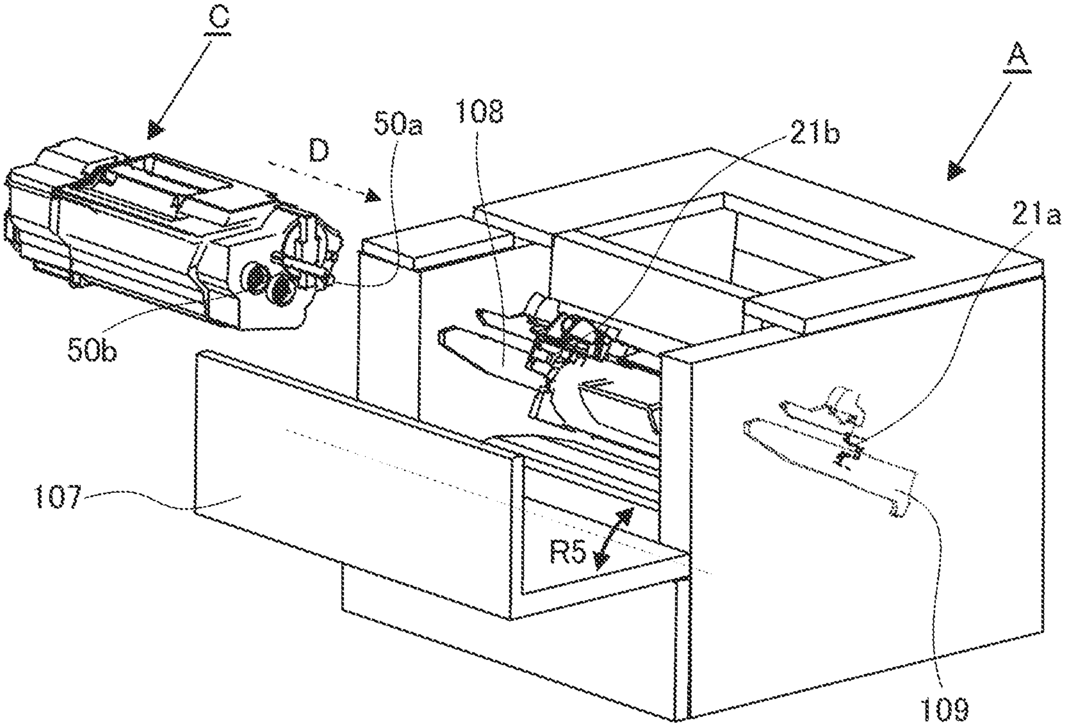

Parts (a) and (b) of FIG. 11 are side views for illustrating mounting of the process cartridge and the toner container according to the embodiment into the apparatus main assembly.

Figure 12:
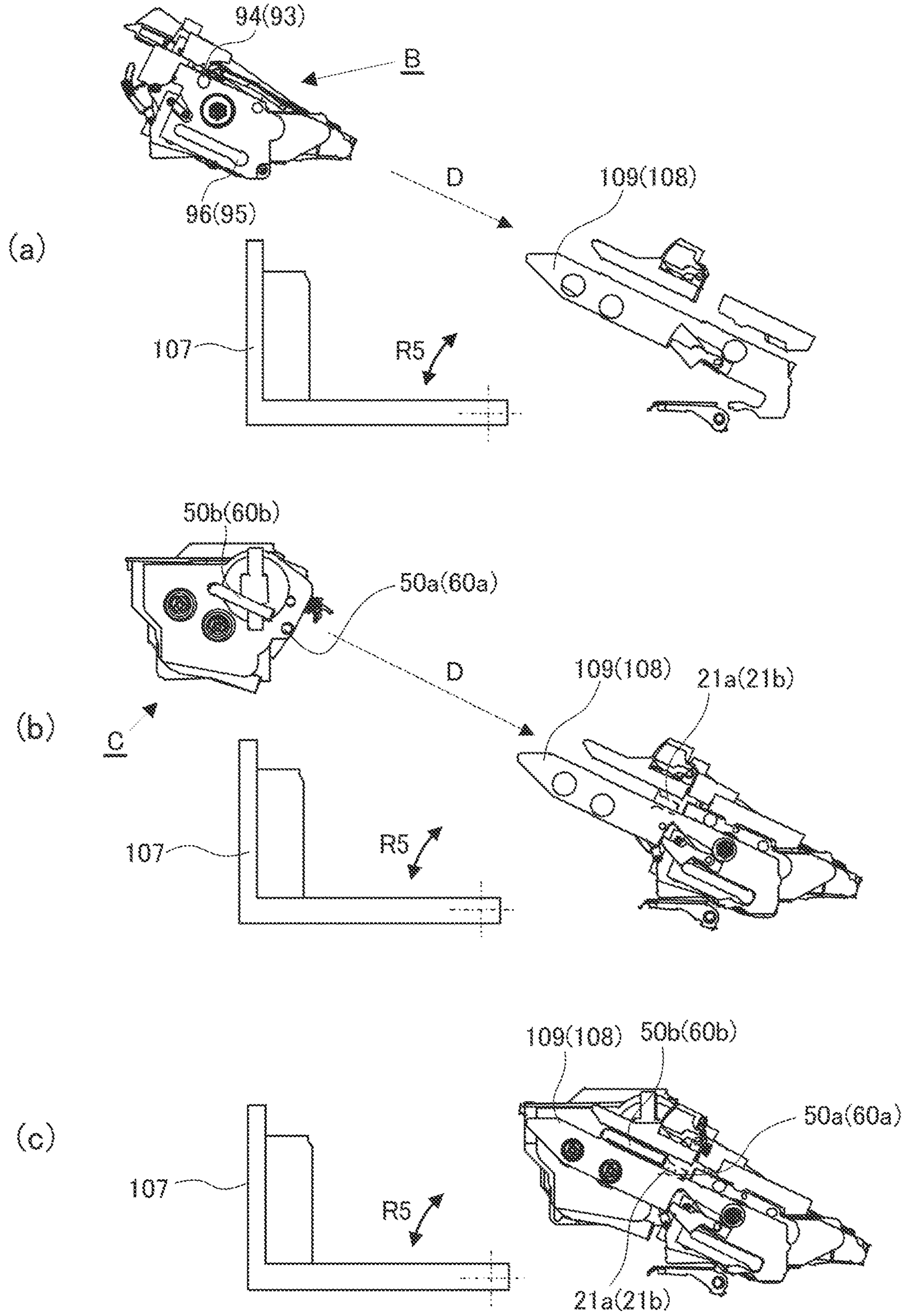

Parts (a) to (c) of FIG. 12 are side views for illustrating mounting of the process cartridge and the toner container according to the embodiment into the apparatus main assembly.

Figure 13:
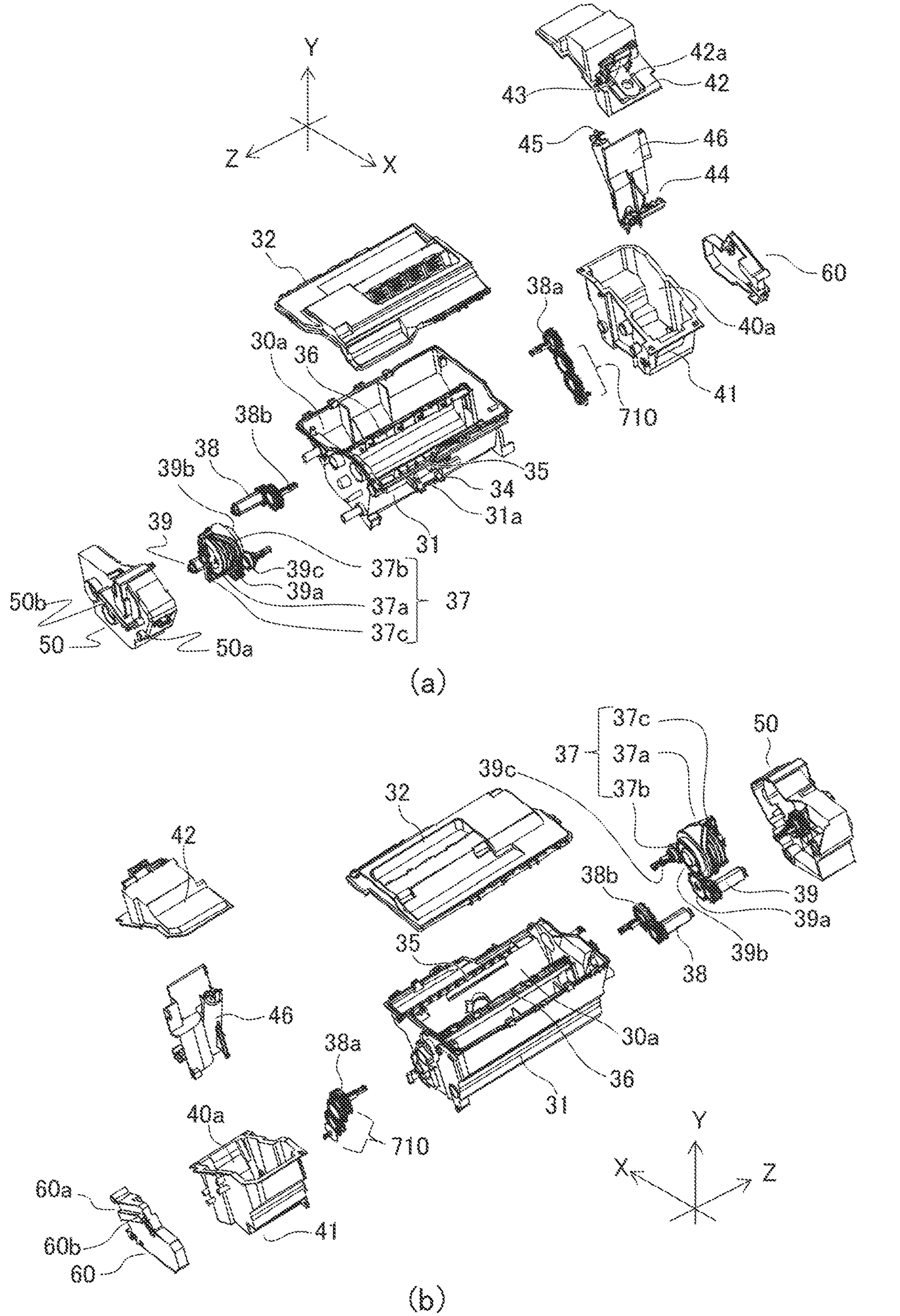

Parts (a) and (b) of FIG. 13 are exploded views of the toner container according to the embodiment.

Figure 14:
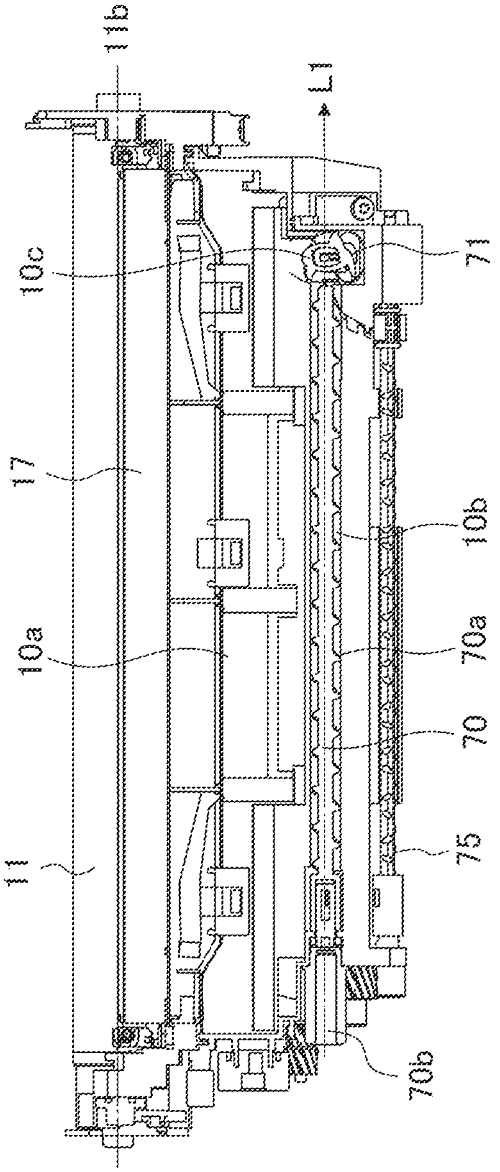

FIG. 14 is a sectional view of a cleaning unit of the process cartridge according to the embodiment.

Figure 15:
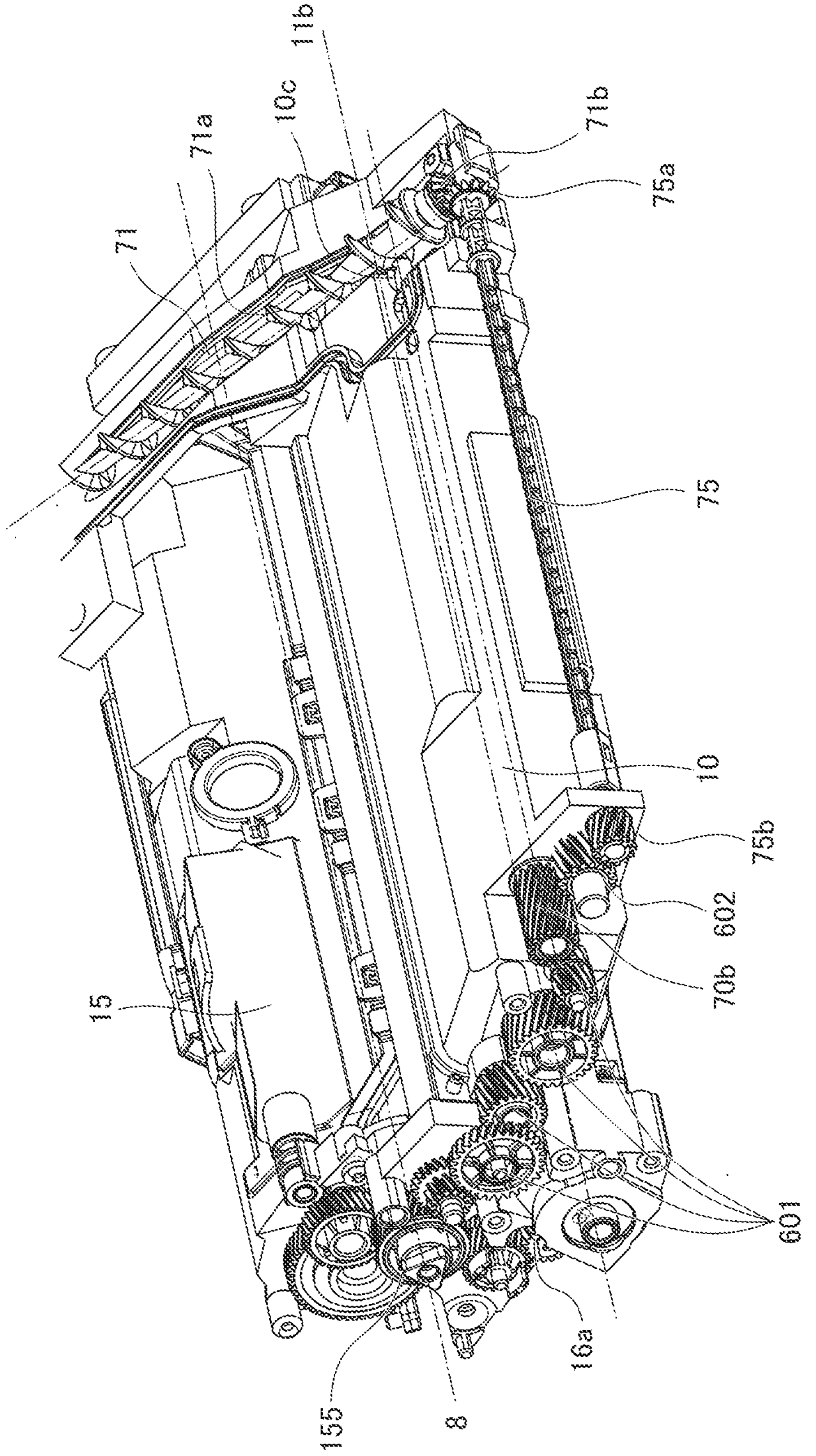

FIG. 15 is a perspective view of the process cartridge according to the embodiment.

Figure 16:
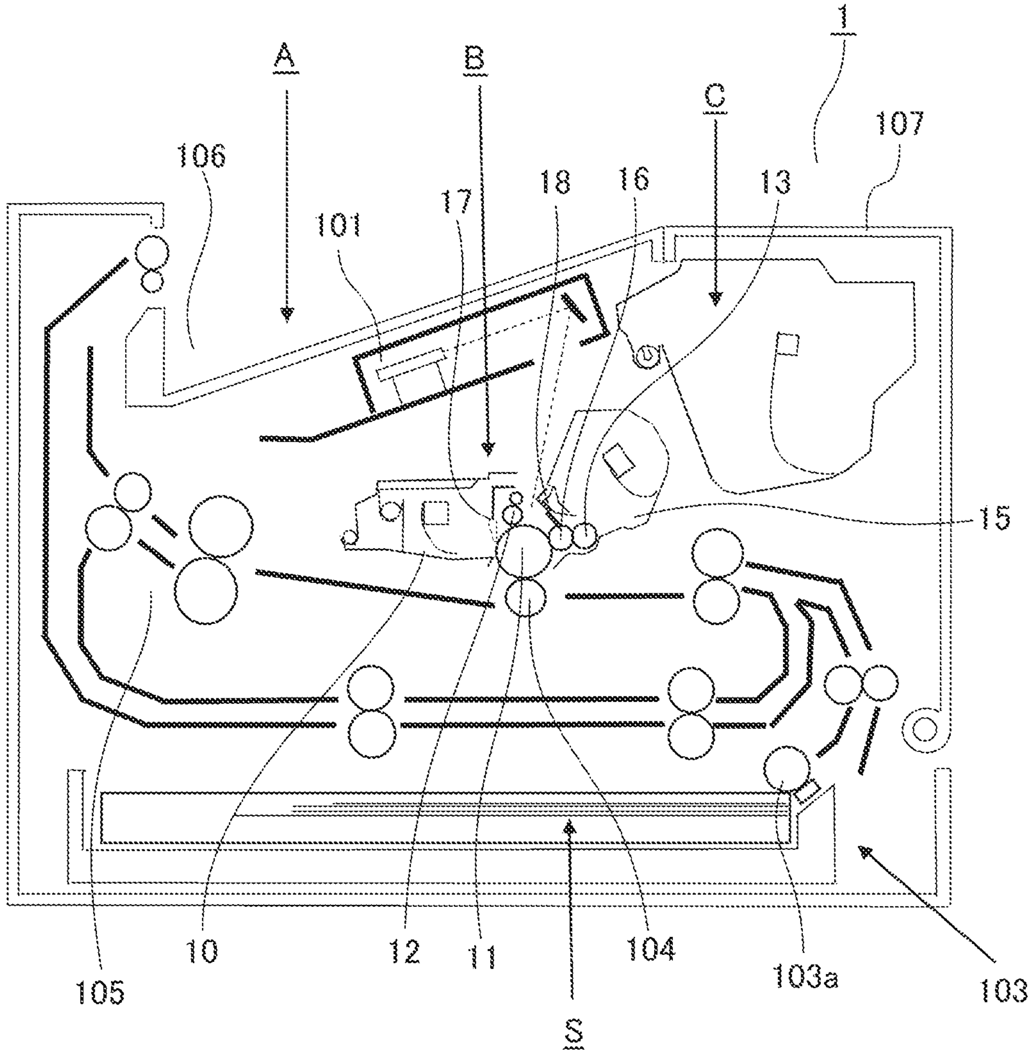

FIG. 16 is a schematic view of a printer according to the embodiment.

Figure 17:
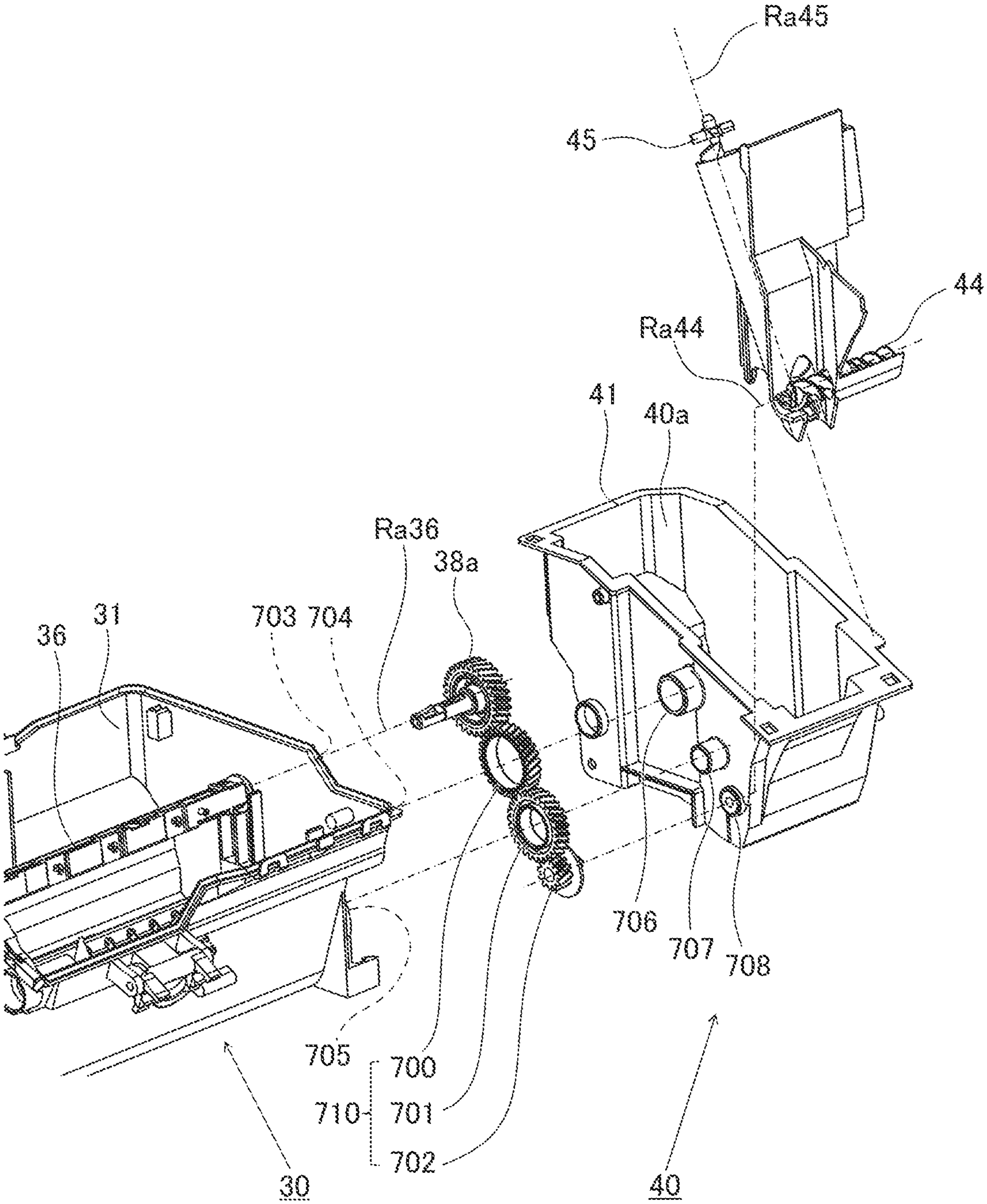

FIG. 17 is an exploded view of a part of the toner container according to the embodiment.

Figure 18:
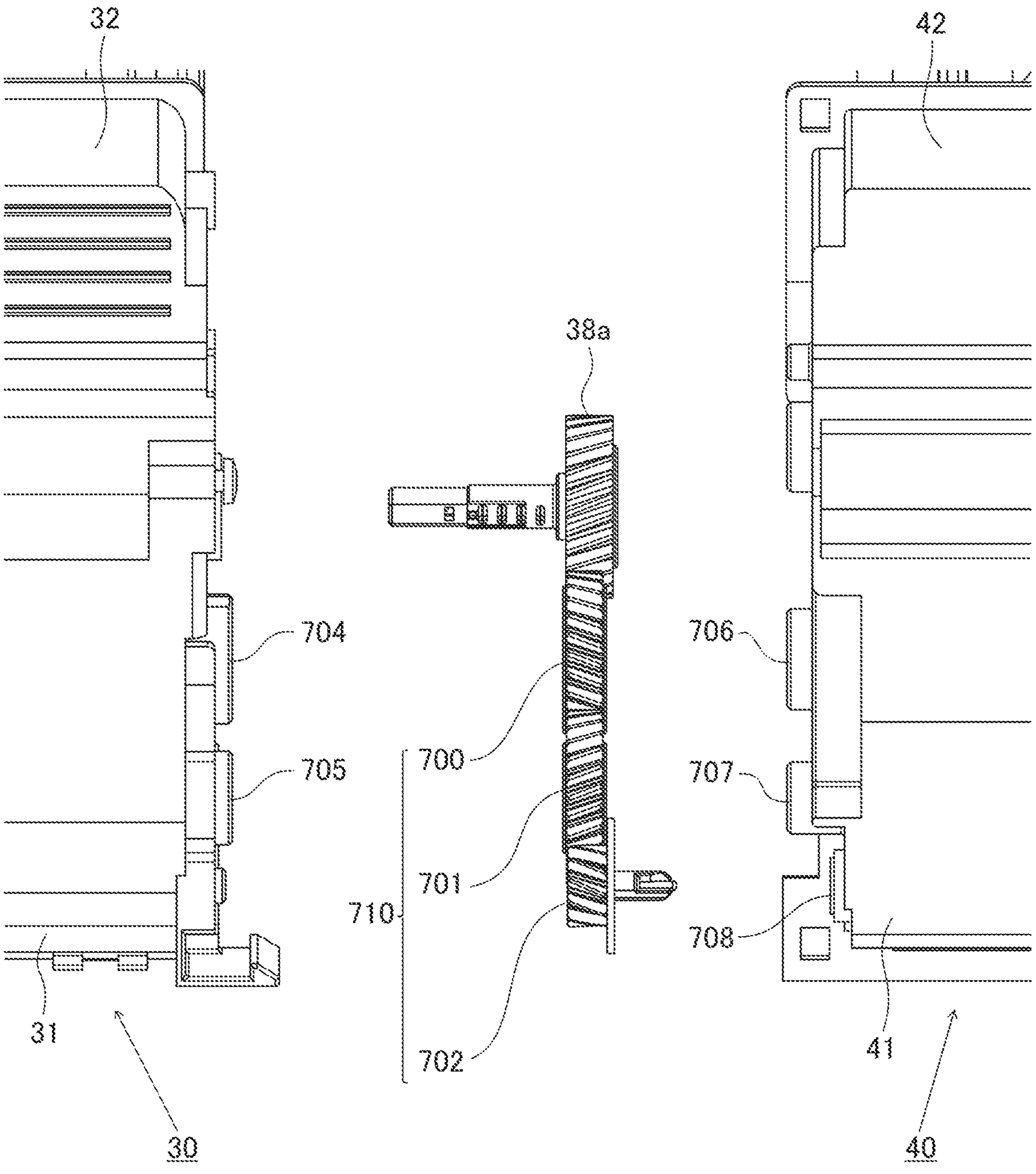

FIG. 18 is a schematic view showing a driving mechanism of a residual toner collecting portion of the toner container according to the embodiment.

Figure 19:
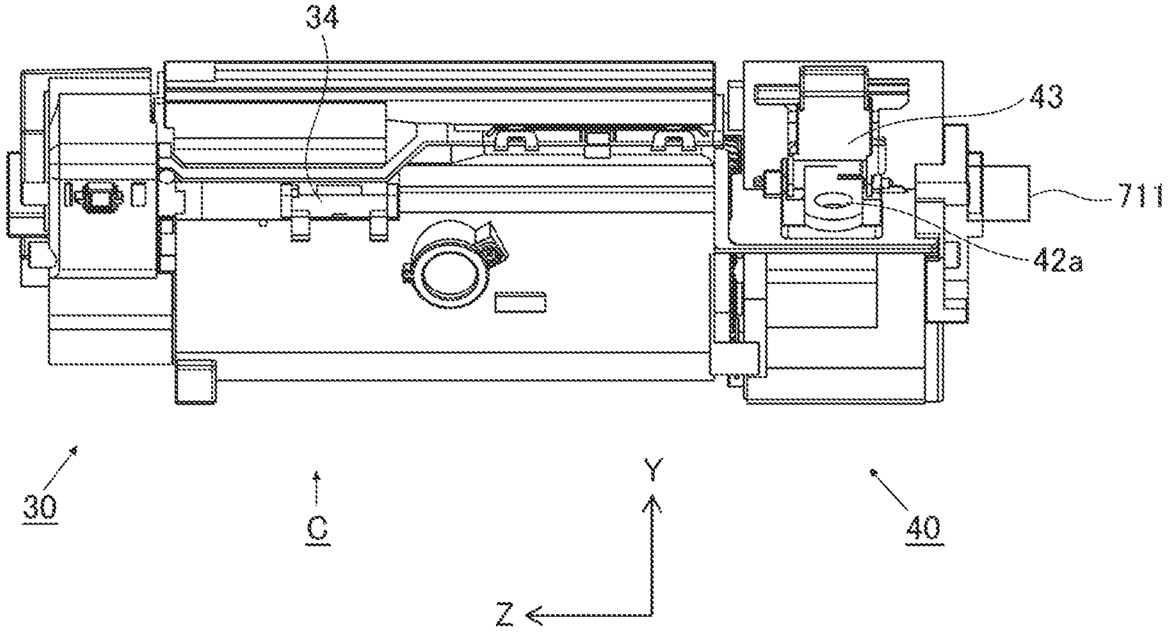

FIG. 19 is a front view of a toner container according to a comparison example.

Figure 20:
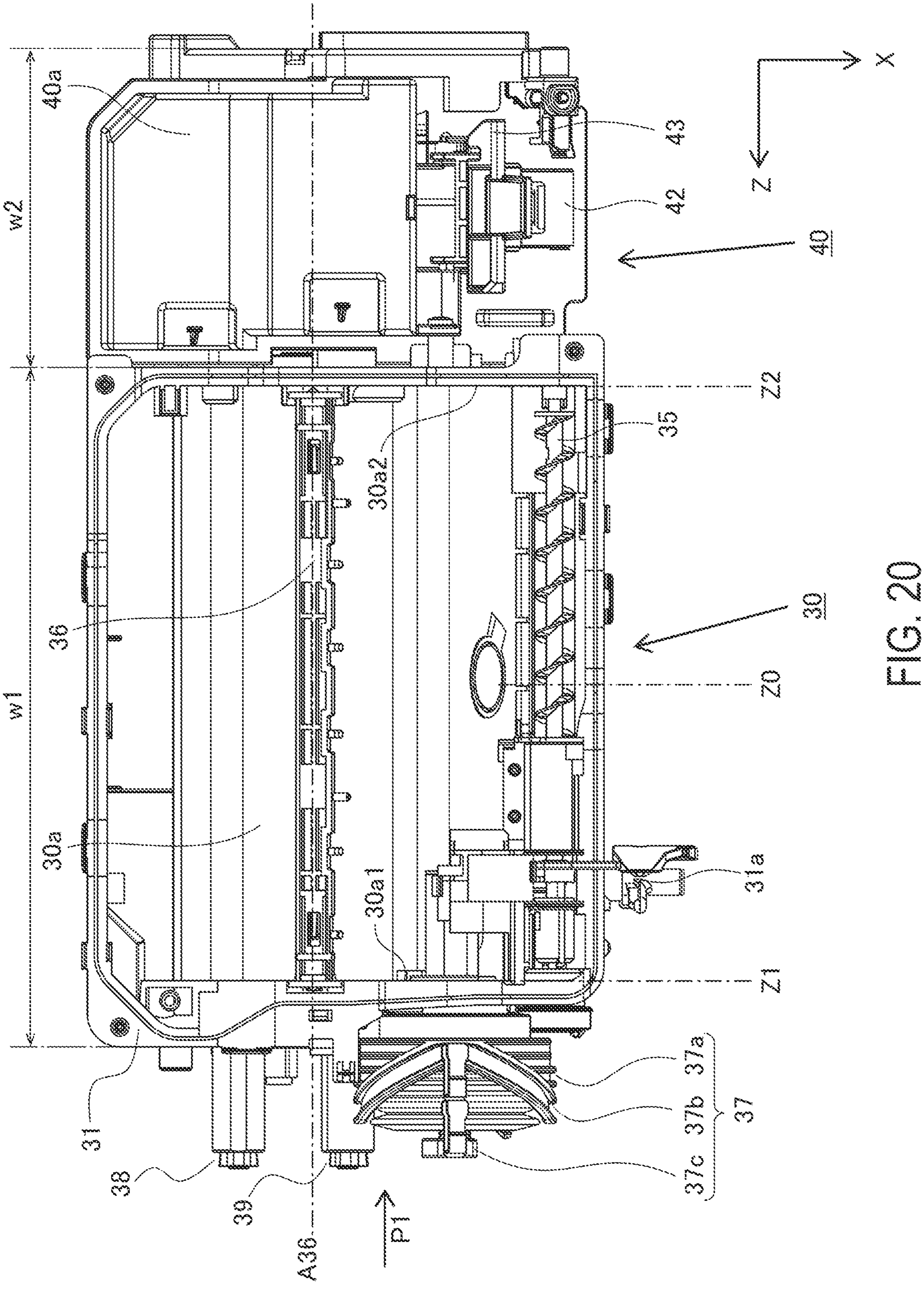

FIG. 20 is a top (plan) view showing an element arrangement of the toner container according to the embodiment 1.

Figure 21:
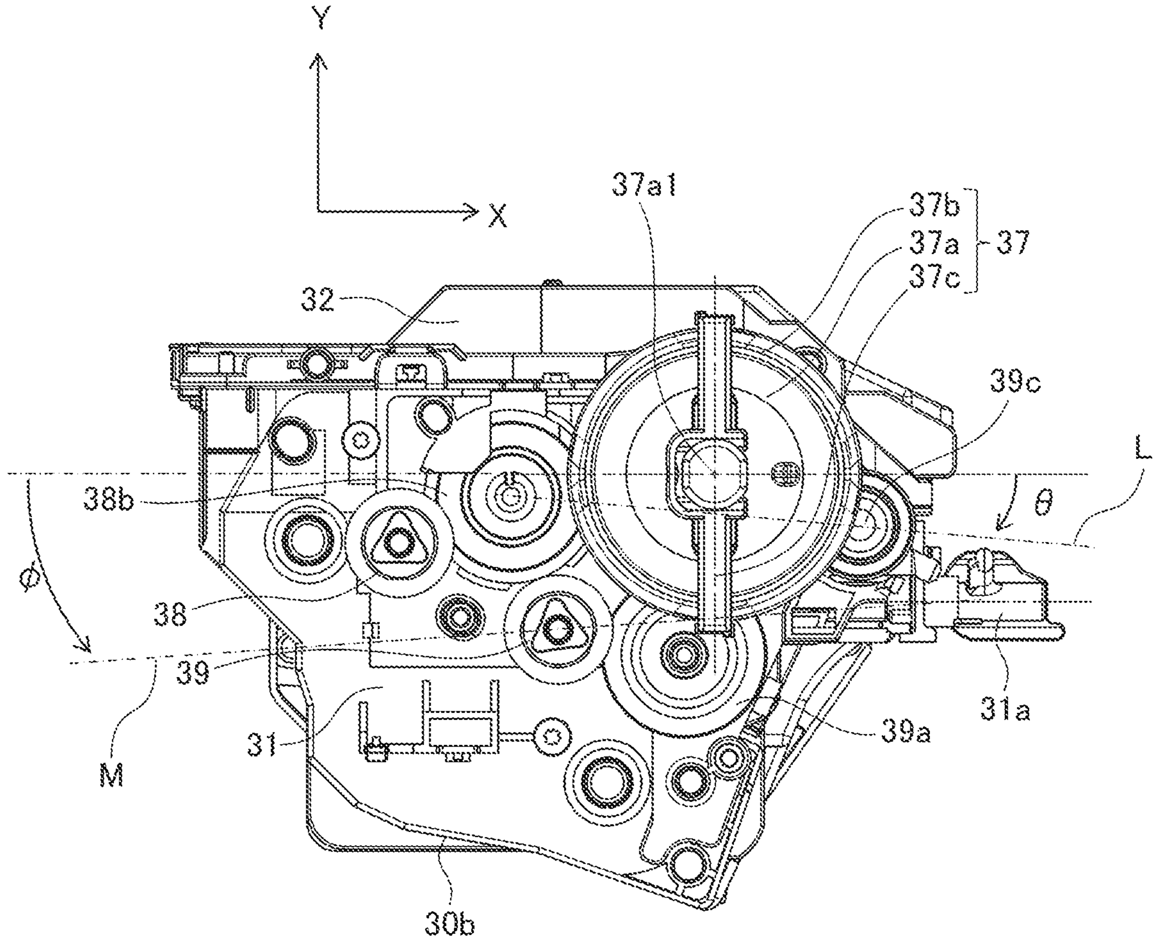

FIG. 21 is a side view showing the element of the toner container according to the embodiment 1.

Figure 22:
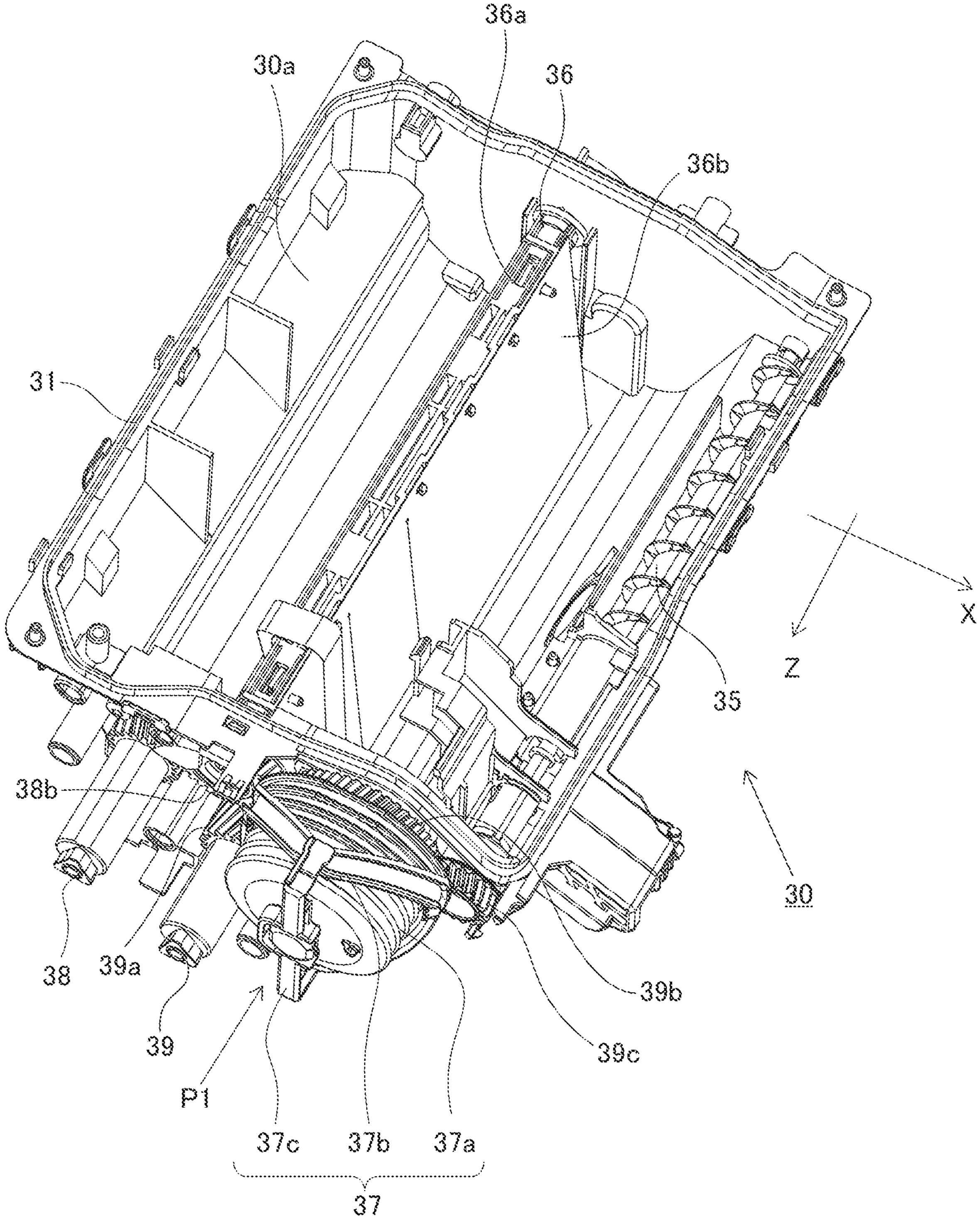

FIG. 22 is a perspective view showing the element arrangement of the toner container according to the embodiment 1.

Figure 23:
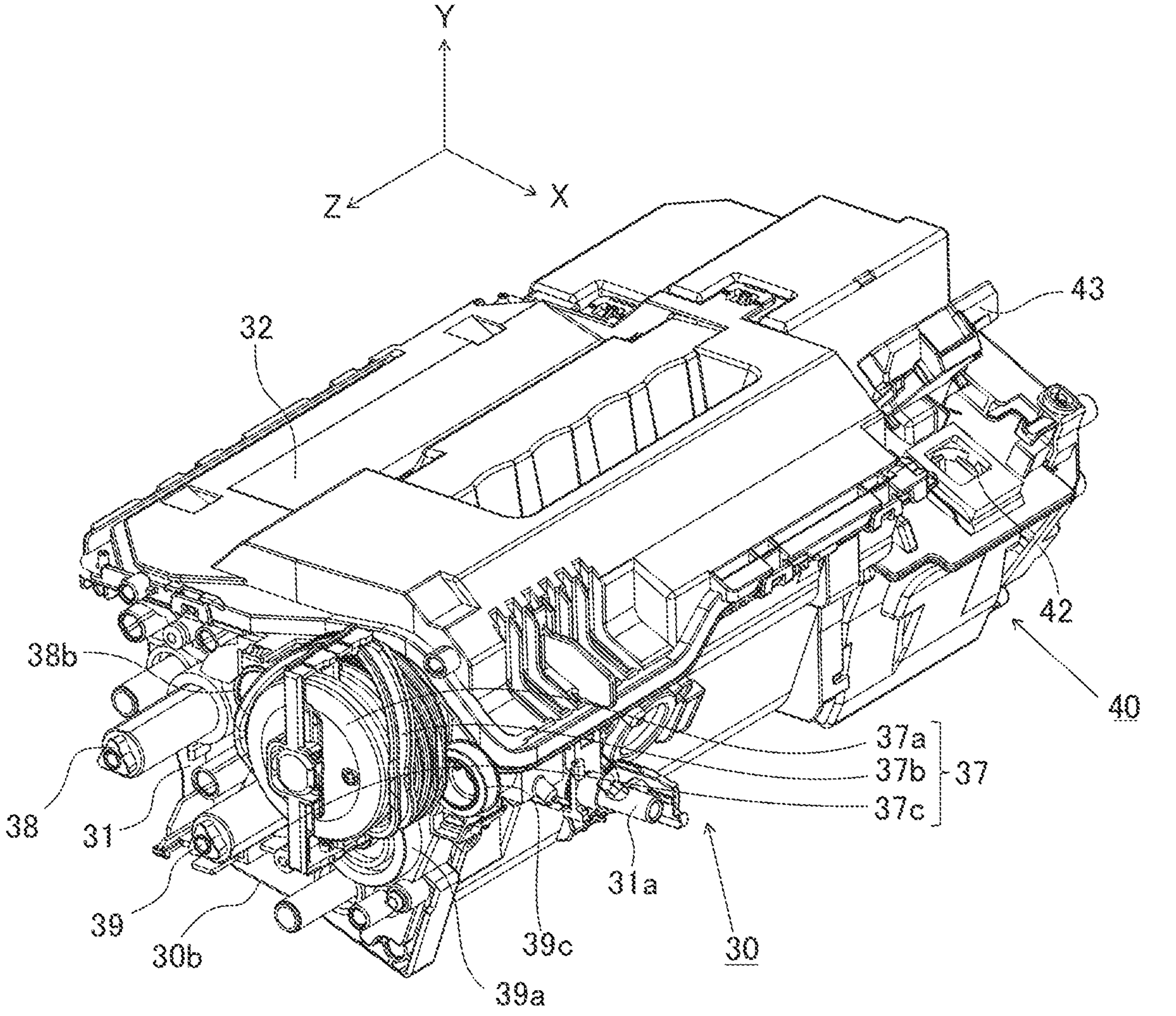

FIG. 23 is a perspective view of the toner container according to the embodiment 1.

DESCRIPTION OF THE EMBODIMENTS

In the following, an apparatus according to the present invention will be described while making reference to the drawings.

In the following description, an "image forming apparatus" is an apparatus for forming an image on a recording material (recording medium) with toner as a developer.

A sheet used as the recording material includes paper such as plain paper or thick paper, a plastic film such as a sheet for an overhead projection, a special-shaped sheet such as an envelope or index paper, and a cloth.

<General Structure of Printer>

FIG. 16 is a schematic view showing a cross-sectional structure of a laser beam printer 1 (hereinafter referred to as a printer 1) as the image forming apparatus according to an embodiment. The printer 1 is constituted by a printer main body A, a process cartridge B, and a toner container (toner cartridge) C.

The printer main body A includes a sheet feeding portion 103, a transfer roller 104, a fixing device 105, and a laser scanner 101. The process cartridge B is provided detachably mountable to the printer main body A. The process cartridge B is prepared by integrally assembly an image bearing member and process means actable on the image bearing member into a unit and is mounted in an image forming apparatus main assembly so as to be removable from the image forming apparatus main assembly. The toner container accommodates the toner as the developer and is mounted in the apparatus main assembly so as to be removable from the apparatus main assembly. The printer main body A can be said as a portion in which the process cartridge B and the toner container C are removed from the printer 1.

Figure 2:
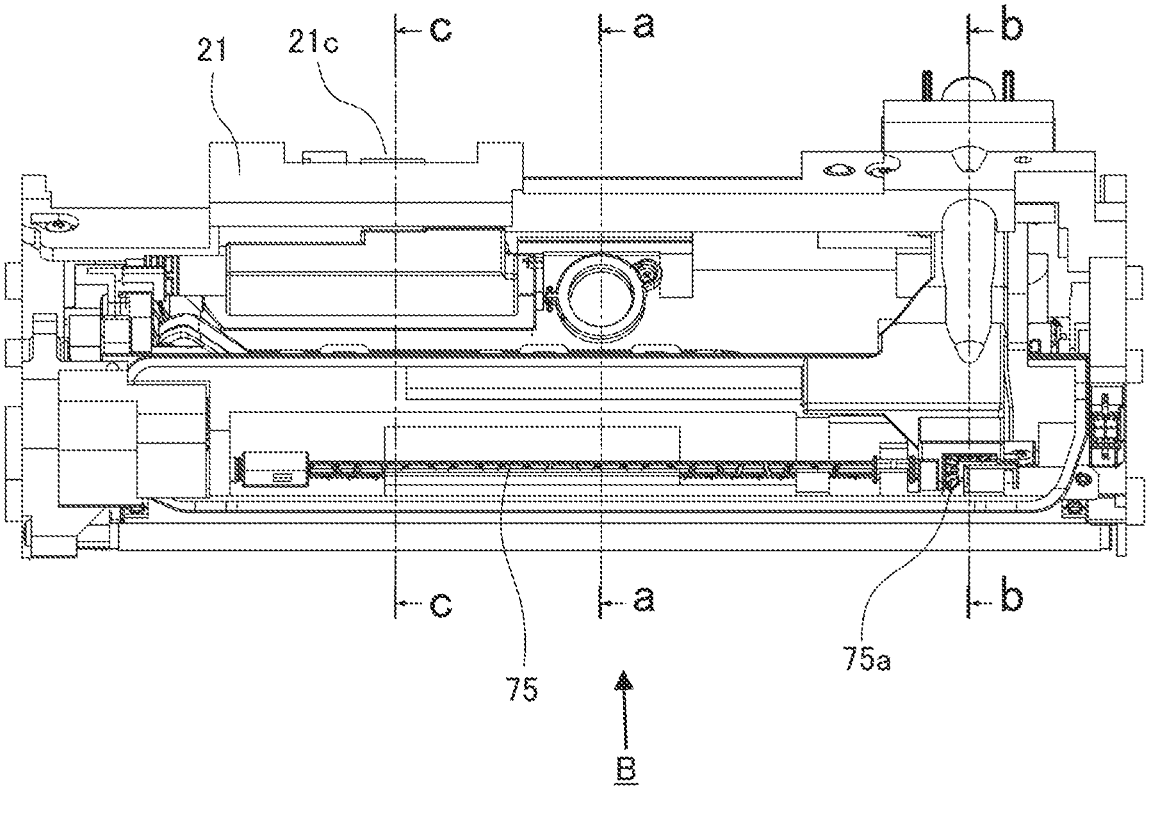
FIG. 2 is a front view of a process cartridge according to the embodiment.
Figure 3:
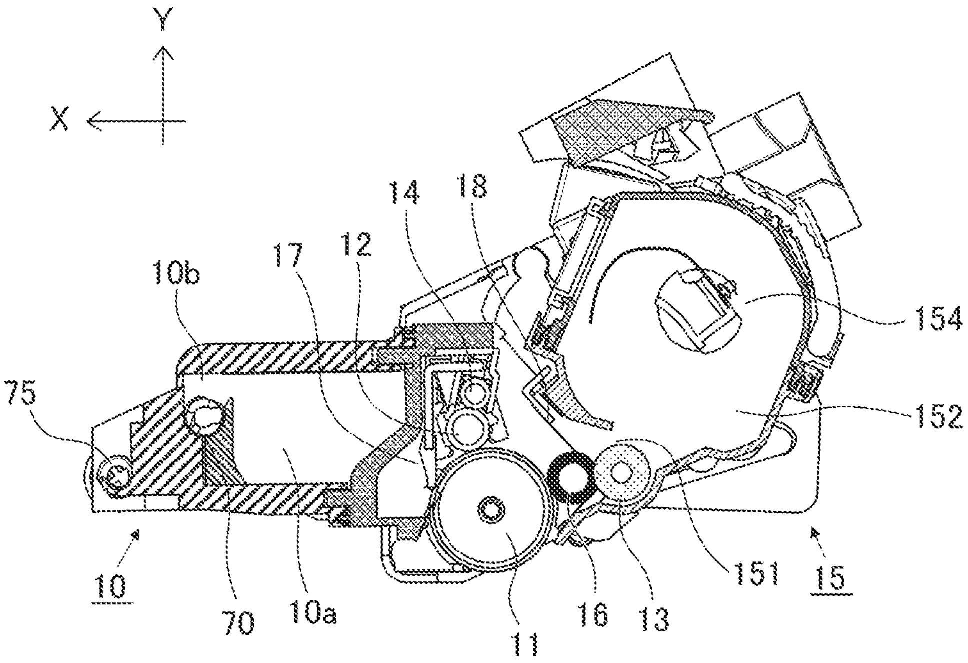
FIG. 3 is a sectional view of the process cartridge according to the embodiment.
Figure 4:
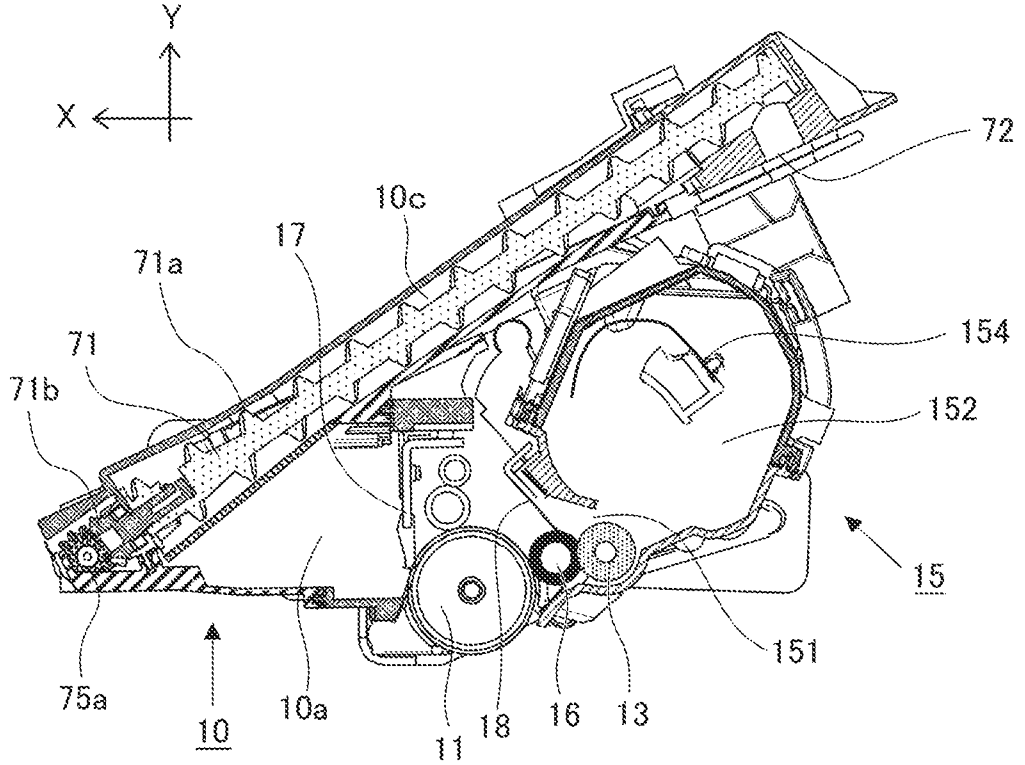
FIG. 4 is a sectional view of the process cartridge according to the embodiment.
Figure 5:
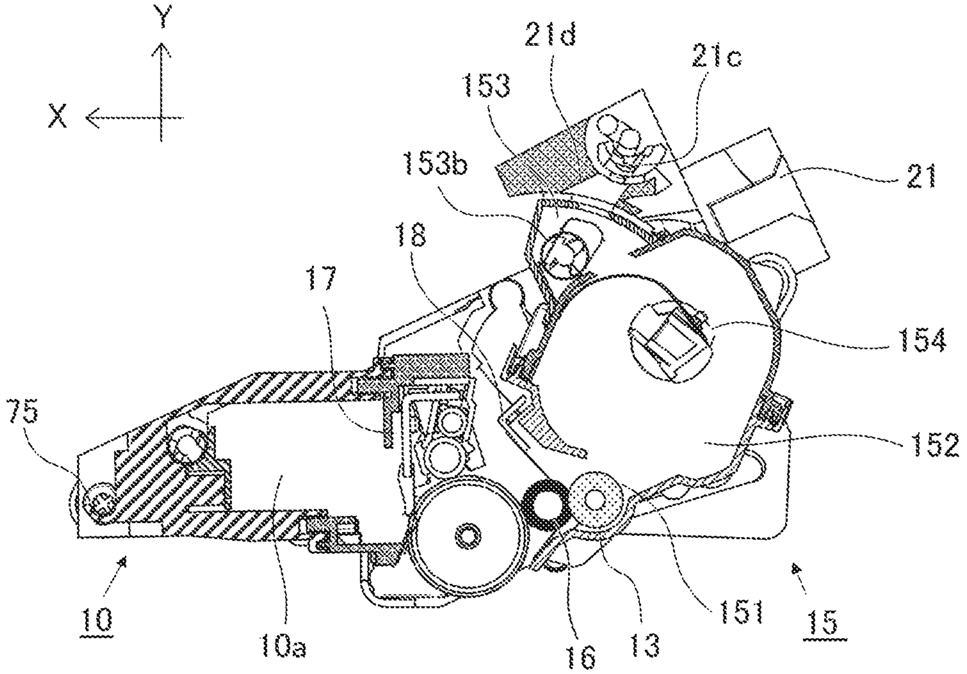
FIG. 5 is a sectional view of the process cartridge according to the embodiment.

The process cartridge B will be described using FIGS. 2 to 5. FIG. 2 is a front view (in which the process cartridge B is viewed from a left (-hand) side in FIG. 16) of the process cartridge B. FIG. 3 is a sectional view (a-a cross section of FIG. 2) of the process cartridge B. FIG. 4 is a sectional view (b-b cross section of FIG. 2) showing a second residual toner (waste toner) conveying passage 10*c* of the process cartridge B. FIG. 5 is a sectional view (c-c cross section of FIG. 2) showing a supply port of the process cartridge B.

As shown in FIGS. 2, 3, and 4, the process cartridge B is constituted by a cleaning unit 10 as a first unit (photosensitive member unit) and a developing unit 15 as a second unit. The cleaning unit 10 includes a photosensitive drum 11 as the image bearing member. The developing unit 15 includes a developing roller 16 as a developing means or a developer carrying member for carrying the toner as the developer.

The cleaning unit 10 includes the photosensitive drum 11 (photosensitive drum assembly), a cleaning blade 17 as a cleaning member for the photosensitive drum 11, and a charging roller 12 as a charging member. Further, the cleaning unit 10 includes a charging roller cleaner 14 as a cleaning member for the charging roller 12, a residual toner primary accommodating portion 10*a*, a first residual toner conveying passage 10*b*, and the second residual toner conveying passage 10*c*.

The photosensitive drum 11 is one in which a photosensitive layer is formed of an organic photosensitive member or the like on an outer peripheral side of a support formed in a cylindrical shape (drum shape). The charging roller 12 is provided so as to contact an outer peripheral surface of the photosensitive drum 11. The charging roller 12 electrically charges the photosensitive drum 11 by voltage application from a high-voltage substrate provided in the printer main body A. The charging roller 12 is rotated by the photosensitive drum 11 (i.e., is rotated by following rotation of the photosensitive drum 11).

The cleaning blade 17 is an elastic member provided so as to contact the outer peripheral surface of the photosensitive drum 11. The cleaning blade 17 elastically contacts the photosensitive drum 11 at a free end thereof, and removes residual toner (waste toner) (described later) from the photosensitive drum 11. The residual toner removed by the cleaning blade 17 is conveyed from the residual toner primary accommodating portion 10*a* to the toner container C through the first residual toner conveying passage 10*b* and the second residual toner conveying passage 10*c*.

As shown in FIG. 5, the developing unit 15 includes a developing chamber 151 in which developing roller 16 is disposed, a developer accommodating chamber 152 for supplying the toner to the developing chamber 151, and a receiving chamber 153 for receiving the toner supplied from the toner container C.

The developing roller 16 supplies the toner to a developing region where the photosensitive drum 11 opposes the developing roller 16. In the developing region, the developing roller develops an electrostatic latent image formed on the photosensitive drum 11.

The developing blade 18 regulates an amount (layer thickness) of the toner deposited on a peripheral surface of the developing roller 16 in contact with the peripheral surface of the developing roller 16. Further, the developing blade 18 triboelectrically charges the toner deposited on the peripheral surface of the developing roller 16 by rubbing the toner so that an electric charge is imparted to toner particles.

In the developer accommodating chamber 152, a stirring member 154 is provided. The toner accommodated in the developer accommodating chamber 152 is sent to the developing chamber 151 while being stirred by rotation of the stirring member 154 and is supplied to the developing roller 16. Incidentally, in the developing chamber 151, an application roller for applying the toner in the developing chamber 151 onto the developing roller 16 can be disposed.

A toner amount in the developer accommodating chamber 152 is detected by an unshown residual amount detecting means. A controller of the printer main body A executes an operation, on the basis of a detection signal of the residual amount detecting means, for supplying the toner from the toner container C to the process cartridge B in the case where the toner amount in the developer accommodating chamber 152 is a certain amount or less.

The receiving chamber 153 is configured to receive the toner from the toner container C through a passage provided in the cleaning unit 10. Specifically, a stay 21 constituting a part of the cleaning unit 10 is provided with a supply port 21*c* for receiving the toner from the toner container C and a delivery portion 21*d* for delivering the toner to the receiving chamber 153 of the developing unit 15.

An operation of the printer 1 will be described using FIG. 16. The printer 1 starts an image forming operation in the case where the printer 1 receives image information from an external device, for example. When the image forming operation is started, the photosensitive drum 11 is rotationally driven by a driving source of the printer main body A, and a surface of the photosensitive drum 11 is electrically charged uniformly to a printer potential by the charging roller 12. Then, the charged surface of the photosensitive drum 11 is exposed to light on the basis of image information by the laser scanner 101. By this, electric charges of an exposed portion are removed so that an electrostatic latent image is formed on the surface of the photosensitive drum 11. To this electrostatic latent image, toner is supplied from the developing roller 16, so that the electrostatic latent image is developed into a toner image. The toner image carried on the photosensitive drum 11 is conveyed to a transfer portion which is a nip between the photosensitive drum 11 and the transfer roller 104.

On the other hand, in parallel to preparation of such a toner image, the sheet feeding portion 103 conveys sheets S one by one. Specifically, a feeding roller 103*a* rotates and feeds the sheets S, stacked on a feeding tray, one by one. Thereafter, the sheet S is conveyed to the transfer portion. Then, during passing of the sheet S through the transfer portion, by a transfer roller 104 to which a transfer voltage is applied from a high-voltage substrate, the toner image is transferred from the photosensitive drum 11 onto the sheet S. Incidentally, toner (residual toner) remaining on the surface of the photosensitive drum 11 without being transferred from the photosensitive drum 11 onto the sheet S in the transfer portion is removed from the surface of the photosensitive drum 11 by the cleaning blade 17.

The sheet S on which the toner image is transferred is conveyed to the fixing device 105. The fixing device 105 is of a heat-fixing type, and heats and presses the toner image on the sheet S while nipping and conveying the nip of a rotatable member pair. By this, an image fixed on the sheet S is obtained. In the case of one-side printing, the sheet S passed through the fixing device 105 is discharged to outside of the printer main body A by a discharging roller pair as a discharging means and is stacked on a discharge tray 106 provided at an upper surface of the printer main body A. In the case of double-side printing, the sheet S on which first side the image is formed by passing through the transfer portion and the fixing device 105 is reversed by the discharging roller pair also functioning as a reversing means, and then is conveyed again toward the transfer portion through a re-conveying passage. Then, the sheet S on which second side an image is formed by passing through the transfer portion and the fixing device 105 a second time is discharged to the outside of the printer main body A by the discharging roller pair and is stacked on the discharge tray 106 provided at the upper surface of the printer main body A.

<Process Cartridge>

A structure of the process cartridge B in this embodiment will be described specifically using FIG. 3, parts (a) and (b) of FIG. 9, and parts (a) and (b) of FIG. 10. Parts (a) and (b) of FIG. 9 are exploded views of the process cartridge B. Part (a) of FIG. 10 is a side view showing a development contact state of the process cartridge B. Part (b) of FIG. 10 is a side view showing a development separation state of the process cartridge B.

As shown in parts (a) and (b) of FIG. 9, at an end portion of the developing unit 16 with respect to an axial direction of the developing roller 16, bearing members 4 and 5 are provided. The developing unit 15 is connected to the cleaning unit 10 so as to be swingable (rotatable) about a swing axis 8 defined by a rectilinear line passing through supporting shafts 8*a* and 8*b* (described later). The swing axis 8 is substantially parallel to a rotational axis 11*b* of the photosensitive drum 11.

A frame of the cleaning unit 10 is constituted by a main frame 20, a stay 21, and a side cover 7. The main frame 20 supports the cleaning blade 17, the charging roller 12, and the charging roller cleaner 14. The photosensitive drum 11 is rotatably supported by a drum pin 22 mounted on the main frame 20 on one side and by a photosensitive drum supporting portion 7*b* provided in the side cover 7 on an opposite side.

A structure in which the developing unit 15 is supported by the cleaning unit 10 will be specifically described. As shown in part (a) of FIG. 9, a cylindrical-shaped portion 5*a* provided on the bearing member 5 is supported by a cylindrical hole-shaped portion 7*a* provided in the side cover 7 of the cleaning unit 10. The supporting shaft 8*a* is defined by a common axis to the cylindrical hole-shaped portion 7*a* of the side cover 7 and the cylindrical-shaped portion 5*a* of the bearing member 5. Further, as shown in part (b) of FIG. 9, a pin 6 is inserted so as to bridge over a cylindrical hole-shaped portion 20*a* of the main frame 20 of the cleaning unit 10 and a cylindrical-shaped portion 5*a* of the bearing member 4. The supporting shaft 8*b* is defined by a common axis to the pin 6 and the cylindrical hole-shaped portion 4*a* of the bearing member 4. The supporting shaft 8*a* and the supporting shaft 8*b* are disposed substantially on the same axis, so that the swing axis 8 is defined by the rectilinear line including the supporting shafts 8*a* and 8*b* as described above.

The developing unit 15 is movable about the swing axis 8 between a contact position where the developing roller 16 contacts the photosensitive drum 11 and a separated position where the developing roller 16 is separated from the photosensitive drum 11. In the following, a state of the process cartridge B when the developing unit 15 is in the contact position is referred to as a "development contact state", and a state of the process cartridge B when the developing unit 15 is in the separated position is referred to as a "development separation state".

The process cartridge B includes pressing springs 19*a* and 19*b* as elastic members for urging the developing unit 15. The pressing springs 19*a* and 19*b* are spring members (tension springs) connecting the developing unit 15 and the cleaning unit 10 to each other. The developing unit 15 is urged toward the contact position by the pressing springs 19*a* and 19*b*.

Further, the printer A includes a separating mechanism 100 described later as an actuator for moving the developing unit 15 to the contact position and the separated position. A pressing member 100*a* is capable of moving the developing unit 15 between a position where the pressing member 100*a* holds the developing unit in the contact position and a position where the pressing member 100*a* permits movement of the developing unit 15 from the contact position to the separated position. That is, the separating mechanism 100 is capable of moving the developing unit 15 from the contact position to the separated position against an urging force of the pressing springs 19*a* and 19*b*.

An operation for moving the developing unit 15 between the contact position and the separated position will be described using parts (a) and (b) of FIG. 10. Incidentally, in order to illustrate the separating mechanism 100 of the printer A the side cover 7 of the cleaning unit 10 is omitted from parts (a) and (b) of FIG. 10.

As shown in part (a) of FIG. 10, the bearing member 5 is provided with a projected portion 5*b*. The projected portion 5*b* is a portion (portion-to-be-pressed) to be pressed by the pressing member 100*a* provided on the separating mechanism 100. As shown in part (a) of FIG. 10, when the pressing member 100*a* is in a position where the pressing member 100*a* does not contact the projected portion 5*b*, by urging forces of the pressing springs 19*a* and 19*b*, the developing unit 15 is held in the contact position and the developing roller 16 contacts the photosensitive drum 11. In this state, the developing roller 16 is capable of developing the electrostatic latent image formed on the surface of the photosensitive drum 11. That is, the development contact state is a state (state in which the developing unit 15 is in a position during image formation) in which the process cartridge B is capable of executing the image forming operation. Further, the contact position of the developing unit 15 is a position where the developing unit 15 is capable of appropriately executing a developing process by the developing means (developer carrying member).

As shown in part (b) of FIG. 10, the pressing member 100*a* of the separating mechanism 100 is capable of rotating the developing unit 15 against the urging forces of the pressing springs 19*a* and 19*b* in contact with the projected portion 5*b*. That is, by a force received from the pressing member 100*a*, the developing unit 15 is rotated about the swing axis 8 in an R2 direction in part (b) of FIG. 10 (direction from the contact position toward the separated position), so that the developing roller 16 is separated from the photosensitive drum 11. That is, the development separation state is a state (state in which the developing unit 15 is in a position during non-image formation) in the case where the process cartridge B does not execute the image forming operation. Further, the separated position of the developing unit 15 is a state in which the developing unit 15 is in a position where the developing means is more spaced away from the photosensitive drum than from a position where the developing means (developer carrying member) is capable of executing a developing process.

When the pressing member 100*a* returns to an original position (part (a) of FIG. 10), the pressing member 100*a* is separated from the projected portion 5*b*. For this reason, by the urging forces of the pressing springs 19*a* and 19*b*, the developing unit 15 is moved from the separated position to the contact position. That is, as shown in part (a) of FIG. 10, the developing roller 16 is contacted again to the photosensitive drum 11.

Thus, a constitution in which the process cartridge B is capable of being switched in state between the development contact state and the development separation state is employed. For this reason, for example, during the non-image formation, the process cartridge B is put in the development separation state, so that it is possible to reduce a degree of deterioration of the toner and to suppress unnecessary toner consumption during the non-image formation.

<Outline of Toner Container>

Figure 6:
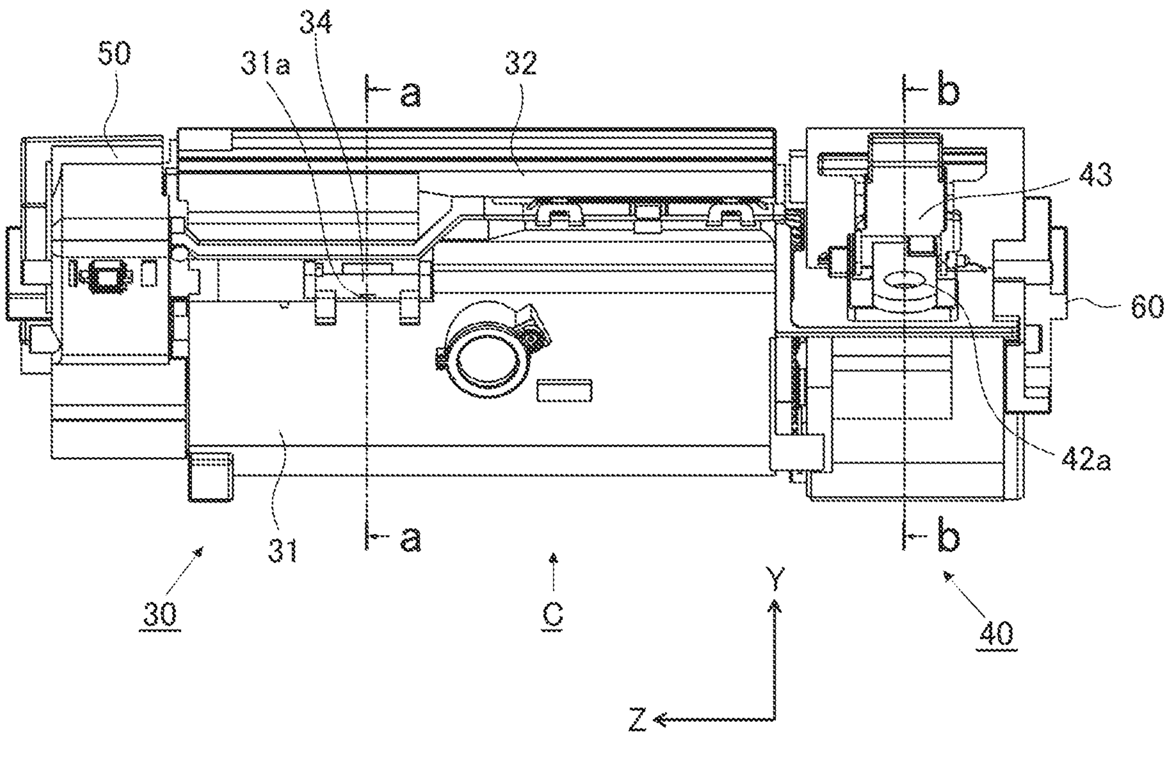
FIG. 6 is a front view of the toner container according to the embodiment.
Figure 7:
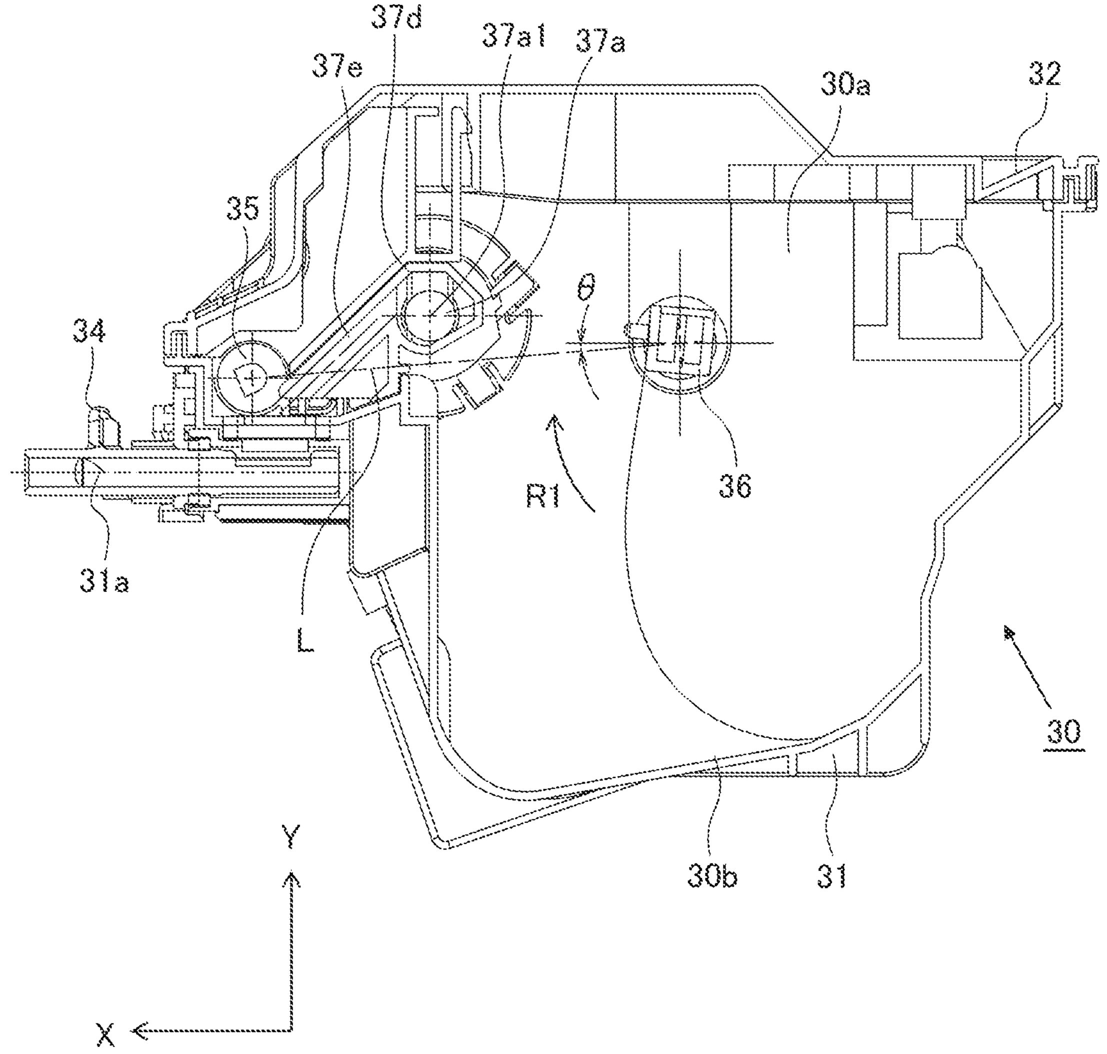
FIG. 7 is a sectional view of the toner container according to the embodiment.
Figure 8:
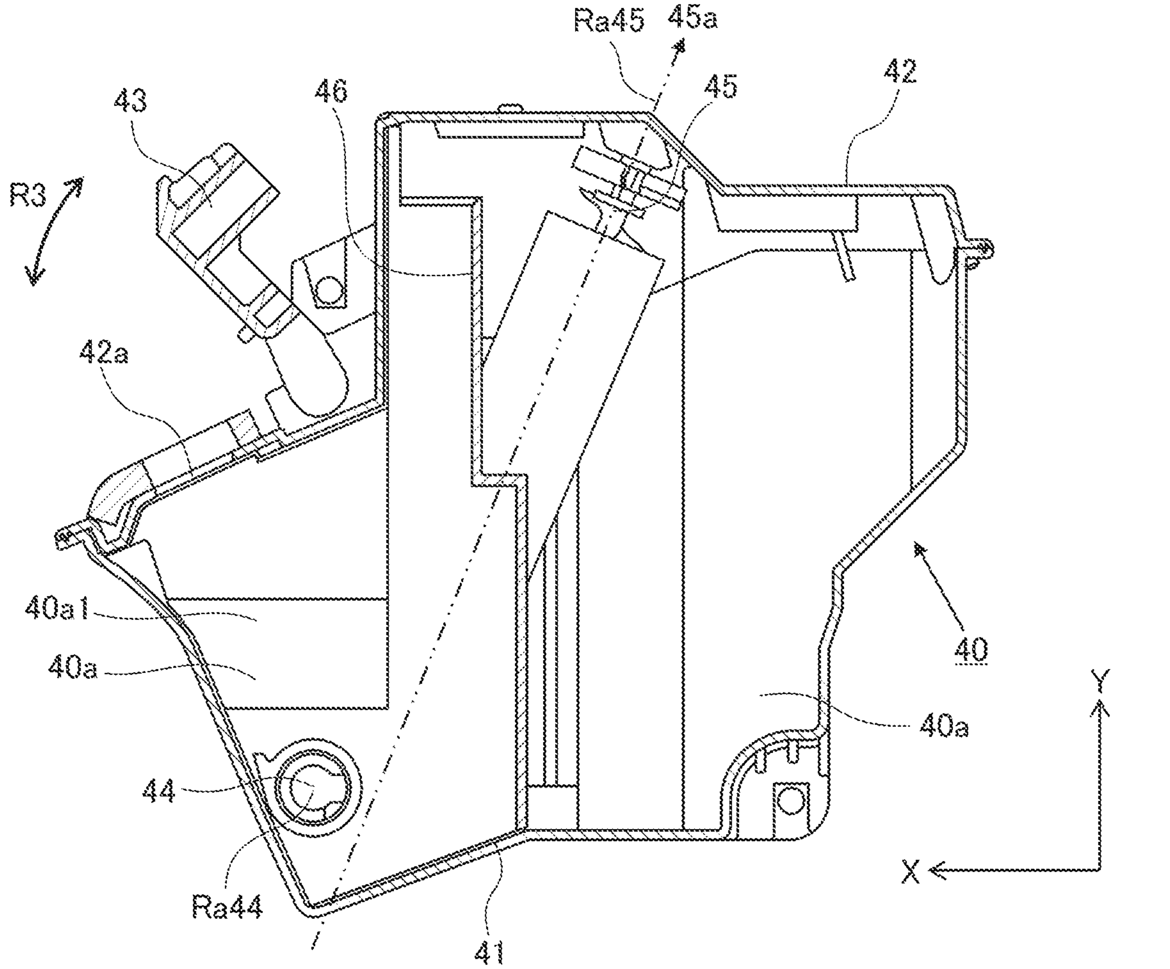
FIG. 8 is a sectional view of the toner container according to the embodiment.

The toner container C will be described using FIGS. 6 to 8 and parts (a) and (b) of FIG. 13. FIG. 6 is a front view (schematic view in which the toner container C is viewed from a left (-hand) side of FIG. 16) of the toner container C. FIG. 7 is a sectional view (a-a cross section of FIG. 6) showing a toner supplying portion 30 of the toner container C. FIG. 8 is a sectional view (b-b cross section of FIG. 6) showing a residual toner collecting portion of the toner container C. Parts (a) and (b) of FIG. 13 are exploded views of the toner container C.

As shown in FIG. 6, the toner container C has an outer configuration extending in a predetermined longitudinal direction. A direction from one end side toward the other end side along the longitudinal direction of the toner container C is indicated by an arrow Z in FIG. 6 and the like. The longitudinal direction of the toner container C is substantially parallel to a direction of the rotational axis of the photosensitive drum 11 and a direction of a rotational axis of the developing roller 16. That is, the longitudinal direction of the toner container C is substantially parallel to a longitudinal direction of the process cartridge B.

A vertical direction (vertically upward direction) in a state in which the toner container C and the process cartridge B are mounted in the printer main body A and in which the printer main body A is installed on the horizontal surface is indicated by an arrow Y in FIG. 6 and the like. Further, a horizontal direction perpendicular to both the longitudinal direction (arrow Z) of the toner container C and the vertical direction (arrow Z) is indicated by an arrow X.

A side which is one end side of the toner container C with respect to the longitudinal direction and on which principally a driving force is inputted from the printer main body A to the toner container C is referred to as a driving side (left side of FIG. 6), and an opposite side thereof is referred to as a non-driving side (right side of FIG. 6). In this embodiment, the driving side is a side on which the toner supplying portion 30 is disposed relative to the residual toner collecting portion 40, and the non-driving side is a side on which the residual toner collecting portion 40 is disposed relative to the toner supplying portion 30. Further, an in-plane direction on an imaginary flat plane perpendicular to the longitudinal direction (arrow Z) is also collectively referred to as a short (side) direction.

<Toner Supplying Portion>

As shown in FIG. 6, the toner container C includes the toner supplying portion (first chamber) for supplying the toner the process cartridge B, the residual toner collecting portion 40 (second chamber) for collecting the residual toner from the process cartridge B, and a pump unit 37 (air supply unit). Incidentally, the pump unit 37 is provided inside a driving-side side cover 50 of the toner container C (part (a) of FIG. 13).

The toner supplying portion 30 includes a toner accommodating portion 30*a* for accommodating the toner as shown in FIG. 6, FIG. 7, and parts (a) and (b) of FIG. 13. The toner accommodating portion 30*a* is a first toner accommodating portion for accommodating the toner for being supplied to the outside of the toner container C. The toner accommodating portion 30*a* is formed by a supplying portion frame 31 and a supplying portion cover 32. The supplying portion frame 31 is provided with a toner outlet port (discharge opening) 31*a* for permitting discharge of the toner in the toner accommodating portion toward the developing unit 15. The toner outlet port 31*a* is disposed so as to oppose a supply port (supply opening) 21*c* (FIG. 5) of the process cartridge B in a state in which the toner container C is mounted in the printer main body A. The toner outlet port 31*a* and the supply port 21*c* communicate with each other, so that the toner can be supplied to the process cartridge B. Outside the supply portion frame 31, a shutter member 34 for opening the toner outlet port 31*c* in a closed state in interrelation with mounting of the toner container C into the printer main body A is provided.

In the toner accommodating portion 30*a*, a supplying screw 35 as a screw portion for conveying the toner toward the toner outlet port 31*a* and a stirring and conveying unit 36 as a stirring member for stirring the toner are provided. The stirring and conveying unit 36 in this embodiment is a stirring and conveying member for stirring and conveying the toner toward the supplying screw 35 by being rotated.

Each of the supplying screw 35 and the stirring and conveying unit 36 conveys and stirs the toner by being rotated about its rotational axis extending in the longitudinal direction. That is, each of the supplying screw 35 and the stirring and conveying unit 36 is an example of a toner conveying means (first toner conveying means) for conveying the toner. The stirring and conveying unit 36 includes a shaft portion 36*a* (see also FIG. 22) to which a driving force is transmitted and a stirring portion 36*b* which projects from the shaft portion 36*a* in a radial direction and which conveys and stirs the toner by being rotated together with the shaft portion 36*a*. The shaft portion 36*a* extends in the longitudinal direction so as to penetrate through the toner accommodating portion 30*a*. The stirring portion 36*b* is formed, for example, with a flexible resin sheet. The toner conveyed to the toner outlet port 31*a* by the stirring and conveying unit 36 and the supplying screw 35 is discharged through the toner outlet port 31*a* by the pump unit 37.

As shown in parts (a) and (b) of FIG. 13, the pump unit 37 includes a pump 37*a* constituted so as to change an inside volume thereof by being expanded and contracted in the longitudinal direction of the toner container C and a cam 37*b* provided rotatably and coaxially with the pump 37*a*. Further, the pump unit 37 includes a link arm 37*c* for expanding and contracting the pump 37*a* by being moved rectilinearly in the longitudinal direction with rotation of the cam 37*b*.

The pump 37*a* has a cylindrical outer configuration, and a cylindrical side surface portion thereof is formed in a bellows-like shape.

Accordingly, the pump 37*a* is capable of being expanded and contracted in a direction long a center axis of the cylindrical-shaped portion. The cam 37*b* and the link arm 37*c* constitute a cam mechanism for driving the pump 37*a* for converting a rotational driving force inputted to the toner container C into translatory (rectilinear) motion (expanding and contracting motion) in a contraction direction of the pump 37*a* and an expansion direction opposite to the contraction direction. Incidentally, the contraction direction of the pump unit 37 is a direction substantially parallel to the longitudinal direction of the toner container C (i.e., substantially parallel to the arrow Z), and is a direction from the driving side toward the non-driving side of the toner container C.

<Driving Constitution of Toner Supplying Portion>

A driving constitution of the toner supplying portion 30 will be described using FIG. 7 and parts (a) and (b) of FIG. 13. As shown in parts (a) and (b) of FIG. 13, the toner supplying portion 30 includes a stirring drive input portion 38 (first drive input portion) for driving the stirring and conveying unit 36 and a pump/screw drive input portion 39 (second drive input portion) for driving the pump unit 37 and the supplying screw 35. The stirring drive input portion 38 is a driving force receiving portion for driving the stirring and conveying unit 36 (stirring member) by receiving the driving force from the outside of the toner container C. The pump/screw drive input portion 39 is a driving force receiving portion for driving the pump unit 37 and the supplying screw 35 by receiving the driving force from the outside of the toner container C. Each of the stirring and conveying unit 38 and the pump/screw drive input portion 39 is disposed on one end side (driving side) with respect to the longitudinal direction of the toner container C.

The toner container C is provided with the stirring drive input portion 38 and the pump/screw drive input portion 39 separately from each other, so that the stirring and conveying unit 36, the pump unit 37, and the supplying screw 35 can be drive-controlled independently. Specifically, the stirring and conveying unit 36 is continuously driven during the image formation, while the pump unit 37 and the supplying screw 35 can be driven intermittently only at a timing when the supply of the toner to the process cartridge B is needed. The timing when the supply of the toner to the process cartridge B is needed is discriminated by a controller of the printer main body A on the basis of a detection signal of the above-described remaining amount detecting means.

As viewed in the longitudinal direction, adjacent to the stirring drive input portion 38, a stirring driving-side gear 38*b* for transmitting the rotational driving force to the stirring and conveying unit 36 is disposed. The stirring driving-side gear 38*b* is provided coaxially with the stirring and conveying unit 36 on one end side with respect to the longitudinal direction, and is rotated integrally with the stirring and conveying unit 36. The stirring driving-side gear 38*b* rotates the stirring and conveying unit 36 in the R1 direction of FIG. 7 by receiving the driving force from the stirring drive input portion 38. By the rotation of the stirring and conveying unit 36 in the R1 direction, the toner in the toner accommodating portion 30*a* is conveyed toward the supplying screw 35.

As viewed in the longitudinal direction, adjacent to the pump/screw drive input portion 39, a cam driving gear 39*a* rotated by receiving a driving force from the pump/screw drive input portion 39 is provided. Adjacent to the cam driving gear 39*a*, a cam gear 39*b* rotated by receiving the driving force from the cam driving gear 39*a* is provided. The cam gear 39*b* is formed integrally with a cam 37*b*. For that reason, the cam gear 39*b* is rotated with rotation of the pump screw drive input portion 39, whereby the cam 37*b* of the pump unit 37 is rotated. Then, by the rotation of the cam 37*b*, the link arm 37*c* moves rectilinearly in the longitudinal direction, so that the pump 37*a* is expanded and contracted.

As viewed in the longitudinal direction, adjacent to the cam gear 39*b*, a screw driving gear 39*c* for transmitting a rotational driving force to the supplying screw 35 is provided. The screw gear 39*c* is provided coaxially with the supplying screw 35 on one end side with respect to the longitudinal direction, and is rotated integrally with the supplying screw 35. The screw driving gear 39*c* rotates the supplying screw 35 by receiving the driving force from the cam gear 39*b*. By rotation of the supplying screw 35, the toner in the toner accommodating portion 30*a* is conveyed toward the toner outlet port 31*a* in the longitudinal direction.

As shown in FIG. 6 and parts (a) and (b) of FIG. 13, at an end portion of the toner container C on the driving side, the driving-side side cover 50 is provided. The driving-side side cover 50 is fixed to the toner accommodating portion 30*a* (supplying portion frame 31). The driving-side side cover 50 is a part of the toner container C. The driving-side side cover 50 shaft-supports the stirring drive input portion 38 and the pump/screw drive input portion 39 so as to be rotatable.

Further, the driving-side side cover 50 is provided with a positioning boss 50*a* and a portion-to-be-guided 50*b*. These members have a function of regulating an attitude of the toner container C when the toner container C is mounted in the printer main body A as (described later).

<Residual Toner Collecting Portion>

Next, an outline of the residual toner collecting portion 40 will be described. As shown in FIG. 8, the residual toner collecting portion 40 includes a residual toner accommodating portion 40*a*. The residual toner accommodating portion 40*a* is a second toner accommodating portion for accommodating the toner received from outside of the toner container C. The residual toner accommodating portion 40*a* is formed by an accommodating portion frame 41 and an accommodating portion cover 42. The accommodating portion cover 42 is provided with a residual toner inlet port (receiving opening) 42*a* for receiving the residual toner collected from the process cartridge B. The residual toner collecting portion 40 includes a shutter member 43 for opening and closing the residual toner inlet port 42*a*. The shutter member 43 is opened and closed in an arrow R3 direction in interrelation with mounting and demounting of the toner container C relative to the printer main body A.

As shown in parts (a) and (b) of FIG. 13, in the residual toner accommodating portion 40*a*, a partitioning member 46, and a first residual toner screw 44 and a second residual toner screw 45, which are a residual toner conveying means (second toner conveying means) for conveying the residual toner in the residual toner accommodating portion 40*a*, are provided. The first residual toner screw 44 and the second residual toner screw 45 are constituted so as to be rotatable about a rotational axis Ra44 and a rotational axis Ra45, respectively, as shown in FIG. 17. The first residual toner screw 44 conveys the residual toner, dropped from the residual toner inlet port 42*a*, in the longitudinal direction of the toner container C. The second residual toner screw receives the driving force from the first residual toner screw 44 and conveys the residual toner, conveyed from the first residual toner screw 44, obliquely upward. The rotational axis Ra45 extends in a direction crossing a direction of the rotational axis Ra45. By this, the residual toner can be efficiently accommodated in the residual toner accommodating portion 40*a*.

To the residual toner accommodating portion 40*a*, drive is transmitted in the following manner. As shown in parts (a) and (b) of FIG. 13, the stirring and conveying unit 36 is provided with a stirring non-driving-side gear 38*a* on a side opposite from the above-described stirring driving-side gear 38*b* with respect to the longitudinal direction. The driving force inputted to the above-described stirring driving-side gear 38*b* on the driving side of the toner supplying portion is transmitted to a non-driving side of the toner supplying portion 30 through the stirring and conveying unit 36, and thus is transmitted to the stirring non-driving-side gear 38*a*.

As viewed in the longitudinal direction, adjacent to the stirring non-driving-side gear 38*a*, a gear train 710 is provided for transmitting drive to the first residual toner screw 44 in the residual toner accommodating portion 40*a*. That is, the first residual toner screw 44 is rotated by receiving the driving force from the printer main body A via the stirring drive input portion 38, the stirring driving-side gear 38*b*, the stirring and conveying unit 36, the stirring non-driving-side gear 38*a*, and the gear train 710.

As shown in FIG. 6 and parts (a) and (b) of FIG. 13, at an end portion of the toner container C on the non-driving side (residual toner collecting portion 40 side), a non-driving-side side cover 60 is provided. The non-driving-side side cover 60 is fixed to the residual toner accommodating portion 40*a* (accommodating portion frame 41). The non-driving-side side cover 60 is a part of the frame of the toner container C.

Further, the non-driving-side side cover 60 is provided with a positioning boss 60*a* and a portion-to-be-guided 60*b*. These members have a function of regulating an attitude of the toner container C when the toner container C is mounted in the printer main body A (as described later).

<Arrangement of Pump Unit and so on in Longitudinal Direction>

An arrangement of the pump unit 37, the toner supplying portion 30, and the residual toner collecting portion 40 in the longitudinal direction will be described using FIGS. 20, 22, and 23. FIG. 20 is a top (plan) view showing an arrangement of the pump unit 37 of the toner container C. FIG. 22 is a perspective view showing the arrangement of the pump unit 37 of the toner container C. FIG. 23 is a perspective view showing the entirety of the toner container C. For explanation, from FIGS. 20 and 22, the driving-side side cover 50 is omitted.

As shown in FIG. 20, the pump unit 37 is provided together with the stirring drive input portion 38 and the pump/screw drive input portion 39 on the driving side of the toner container C, i.e., on one end side of the arrow Z direction. The pump 37*a* is contracted in the longitudinal direction, so that the pump unit 37 discharges the toner in the toner accommodating portion 30*a* together with air toward the developing unit 15 through the toner outlet port 31*a*.

The toner supplying portion 30 is disposed inside the pump unit 37 with respect to the longitudinal direction. That is, the toner supplying portion is disposed on a side (non-driving side) upstream of the pump unit 37 with respect to the arrow Z direction. Further, the residual toner collecting portion 40 is disposed on a side (non-driving side) upstream of the toner supplying portion with respect to the arrow Z direction. In other words, with respect to the longitudinal direction of the toner container C, i.e., with respect to a rotational axis direction P1 of the stirring and conveying unit 36 (stirring member), the pump 37*a*, the toner accommodating portion 30*a*, and the residual toner accommodating portion 40*a* are arranged in a named order. Further, in other words, the pump 37*a*, the toner accommodating portion 30*a*, and the residual toner accommodating portion 40*a* are aligned in this order in the rotational axis direction P1 of the stirring and conveying unit 36 (stirring member). The rotational axis direction P1 is a direction from the driving side toward the non-driving side of the toner container C along a rotational axis A36 (FIG. 20) of the stirring and conveying unit 36 (stirring member). A width w1 of the toner accommodating portion 30*a* is wider than a width w2 of the residual toner accommodating portion 40*a*. In this embodiment, the widths w1 and w2 are 160 mm and 60 mm, respectively, and the width w1 of the toner accommodating portion 30*a* may preferably be two times or more the width w2 of the residual toner accommodating portion 40*a*.

For this reason, compared with the case where with respect to the rotational axis direction P1 (longitudinal direction of the toner container C), the pump unit 37, the residual toner accommodating portion 40*a*, and the toner accommodating portion 30*a* are arranged in this order, it becomes possible to realize efficient toner discharge with the air. That is, in this embodiment, when an air conveying force during the contraction of the pump 37*a* is transmitted to the toner outlet port 31*a*, there is no need that the air passes by toner the position of the residual toner accommodating portion 40*a*, and therefore, an air conveying distance can be a short distance, so that it becomes possible to convey the air at high efficiency.

Further, compared with the case where with respect to the rotational axis direction P1, the toner accommodating portion 30*a*, the pump unit 37, and the residual toner accommodating portion 40*a* are arranged in this order, when the driving force is transmitted form the printer main body A to the pump 37*a*, in this embodiment, there is no need that the driving force is transmitted through the toner accommodating portion 30. Therefore, in this embodiment, an additional gear train for transmitting the drive from the toner accommodating portion 30*a* to the pump 37*a* is not needed, and therefore, it becomes possible to improve drive transmission efficiency from the printer main body A to the pump 37*a* in entirety of a drive transmitting system.

Incidentally, in the case where the toner container C is viewed in the rotational axis direction P1, the photosensitive drum 37*a* may preferably at least partially overlap with the toner accommodating portion 30*a* (FIG. 21). Further, in the case where the toner container C is viewed in the rotational axis direction P1, the toner accommodating portion 30*a* may preferably at least partially overlap with the residual toner accommodating portion 40*a* (FIG. 21). By this constitution, it becomes possible to downsize the toner container C with respect to a direction (short direction of the toner container C) perpendicular to the rotational axis direction P1 (longitudinal direction of the toner container C).

<Arrangement of Toner Outlet Port in Longitudinal Direction>

An arrangement of the toner outlet port 31*a* in the longitudinal direction will be described using FIG. 20. As shown in FIG. 20, the toner outlet port 31*a* is disposed inside the pump unit 37, the stirring drive input portion 38, and the pump/screw drive input portion with respect to the longitudinal direction, i.e., on an outlet port side (non-driving side) of the arrow Z direction. In addition, with respect to the longitudinal direction, the toner outlet port 31*a* is disposed on a side closer to the pump unit 37 than to a longitudinal center Z0 of the toner accommodating portion 30*a*, i.e., on a downstream side (driving side) of the arrow Z direction.

Here, the longitudinal center Z0 of the toner accommodating portion 30*a* is an intermediate position, with respect to the rotational axis direction P1 (longitudinal direction) of the stirring and conveying unit 37, between a position Z1 of a side wall 30*a*1 on one side (pump side, driving side) of the toner accommodating portion 30*a* with respect to the longitudinal direction and a position Z2 of an inner surface of a surface wall 30*a*2 on the other side (residual toner accommodating portion side, non-driving side) of the toner accommodating portion 30*a* with respect to the longitudinal direction. The position Z1 of the side wall 30*a*1 can be based on a position of a peripheral portion of an opening through which the side wall 30*a*1 communicates with the inside space of the pump 37*a*. The position of the side wall 30*a*2 can be based on a position of a portion where the side wall 30*a*2 opposes the pump 37*a* with respect to the longitudinal direction. Accordingly, the toner outlet port 31*a* is disposed in a position closer to the pump 37*a* than to the intermediate position (Z0) between the side wall 30*a*2 on the residual toner accommodating portion side and the side wall 30*a*1 on the pump side of the toner accommodating portion 30*a* with respect to the rotational axis direction P1 of the stirring and conveying unit 36. That is, the outlet port of the first toner accommodating portion is disposed in a position of the first toner accommodating portion closer to the pump than to the second toner accommodating portion with respect to the rotational axis direction of the stirring member.

In order to efficiently discharge the toner through the toner outlet port 31*a* by the air conveying portion (positive pressure) generating during contraction of the pump 37*a*, it is preferable that a distance from the pump 37*a* to the toner accommodating portion 30*a* is short. In this embodiment, the toner outlet port 31*a* is disposed on a side closer to the pump 37*a* than to the longitudinal center Z0 of the toner accommodating portion 30*a*, so that air conveying efficiency of the pump 37*a* can be enhanced. However, in the case where the toner conveying force can be sufficiently obtained, the toner outlet port 31*a* may be disposed at the longitudinal center Z0 or on a side where the toner outlet port 31*a* is more distant from the pump 37*a* than from the longitudinal center Z0.

In this embodiment, inside the toner accommodating portion 30*a*, flow passages 37*d* and 37*e* for guiding the air from the pump 37*a* to the toner outlet port 31*a* are provided (FIG. 7). The flow passage 37*d* extends in the longitudinal direction in an inside of the toner accommodating portion 30*a* along a center line 37*a*1 of the pump 37*a*. The flow passage 37*e* extends from the flow passage 37*d* in a direction which is a direction crossing the center line 37*a*1 and which directs toward the toner outlet port 31*a*. As described above, the toner outlet port 31*a* is disposed on the side closer to the pump 37*a* than the longitudinal center Z0 of the toner accommodating portion 30*a*, so that the flow passage 37*d* can be shortened, and correspondingly, a space in which the toner can be accommodated in the toner accommodating portion 30*a* can be extended.

<Arrangement of Pump Unit in Short Direction>

An arrangement of the pump unit 37, the toner supplying portion 30, and the residual toner collecting portion 40 in the short direction will be described using FIGS. 7, 21, and 22. FIG. 21 is a side view showing an arrangement of the pump unit 37 of the toner container C. Also, in FIG. 21, for explaining the arrangement of the pump unit 37, the driving-side side cover 50 is omitted.

FIGS. 7 and 21 show an element arrangement of the toner container C in a cross section of the toner container C in an imaginary flat plane perpendicular to the rotational axis of the stirring and conveying unit 36. An attitude of the toner container C in FIGS. 7 and 21 is an attitude in a state in which the toner container C is mounted in the printer main body A (hereinafter, this attitude is referred to as a main body mounting attitude). In the main body mounting attitude, a line connecting a rotational axis of the stirring and conveying unit 36 and a rotational axis of the supplying screw 35 (hereinafter, this line is referred to as a conveying inter-axial rectilinear line L) is substantially horizontal. Specifically, an angle θ (conveying inter-axial angle) formed between the conveying interaxial rectilinear line L and the horizontal direction (arrow X direction) is within about ±5°. For that reason, the element arrangement described below holds also when the attitude of the toner container C is such an attitude that the conveying inter-axial rectilinear line L is horizontal.

In the main body mounting attitude of the toner container C, the center line 37*a*1 of the pump 37*a* is disposed above the toner outlet port 31*a* (on an upper side of the direction of gravity), i.e., on a downstream side of the arrow Y direction. Here, the center line 37*a*1 is an imaginary rectilinear line extending in the expansion and contraction direction of the pump 37*a* and is a center axis of the pump 37*a* having a substantially cylindrical shape. In the case where the shape of the pump 37*a* is a shape (for example, polygonal pillar-like shape) other than the cylindrical shape, the center line 37*a*1 of the pump 37*a* is an imaginary rectilinear line extending in the expansion and contraction direction and is a rectilinear line passing through a center of a circle circumscribed on an outer configuration of the pump 37*a* as viewed in the expansion and contraction direction.

The pump 37*a* contracts in the longitudinal direction as described above, so that the pump 37*a* imparts the air conveying force to the toner outlet port 31*a*. At this time, during expansion of the pump 37*a* after the toner is conveyed, negative pressure to the pump 37*a* acts on the toner interposed in the toner outlet port 31*a*. However, the pump 37*a* is provided on the upper side of the toner outlet port 31*a* with respect to the direction of gravity, and therefore, back-flow of the toner with rise of the toner due to the negative pressure is suppressed by gravity. Therefore, inside clogging of the pump 37*a* by the back-flow of the toner during expansion of the pump 37*a* is unlikely to occur, so that it becomes possible to maintain the air conveying efficiency of the pump 37*a*.

Further, in the main body mounting attitude of the toner container C, the toner outlet port 31*a* is disposed above (on the upper side of the direction of gravity) at least a lowest portion of a bottom 30*b* of the toner accommodating portion 30*a*, i.e., on a downstream side of the arrow Y direction. As a comparison example, when the toner outlet port 31*a* is provided, for example, at the same height as the bottom 30*b* or in a position lower in height than the bottom 30*b*, the toner in the toner accommodating portion 30*a* is compressed by a self-weight thereof and a bulk density thereof fluctuates, with the result that there is a possibility that a toner discharge amount is not stabilized. On the other hand, as in this embodiment, when the toner outlet port 31*a* is disposed above the bottom of the toner accommodating portion 30*a*, it becomes possible to stabilize the toner discharge amount.

Specifically, in this embodiment, the toner supplied to the toner outlet port 31*a* through the supplying screw 35 is scooped upward from the bottom 30*b* by rotation of the stirring and conveying unit 36, and therefore, the toner is sufficiently fluidized by a stirring action of the toner. Accordingly, the pump 37*a* is capable of imparting the air conveying force to the toner which is sufficiently fluidized by the stirring and conveying unit 36 and which is made substantially constant in bulk density, so that the toner discharge amount is stabilized.

<Arrangement of Pump/Screw Driving Constitution in Longitudinal Direction>

An arrangement of the pump/screw constitution in the longitudinal direction will be described using parts (a) and (b) of FIG. 13 and FIG. 20. As shown in FIG. 20, the pump/screw drive input portion 39 as a drive input portion is disposed outside the pump 37*a* and the toner outlet port 31*a* with respect to the longitudinal direction, i.e., on the downstream side (driving side) of the arrow Z direction. In other words, in the toner supplying portion 30, with respect to the rotational axis direction P1 (direction from the downstream side toward the upstream side of the arrow Z direction) of the stirring and conveying unit 36 (stirring member), the pump/screw drive input portion 39, the pump 37*a*, and the toner outlet port 31*a* are disposed in a named order. By employing this constitution, the pump/screw drive input portion 39 is disposed at an outer end portion of the toner container C with respect to the longitudinal direction, and therefore, it becomes possible to suppress a space of the main body-side driving means with respect to the longitudinal direction when receiving the driving force from the printer main body A.

In addition, as shown in parts (a) and (b) of FIG. 13, the screw driving gear 39*c* as the driving gear is disposed between the pump 37*a* and the toner accommodating portion 30*a*. In other words, in the toner supplying portion 35, in the rotational axis direction P1 (direction from the downstream side toward the upstream side of the arrow Z direction) of the stirring and conveying unit 36 (stirring member), the pump 37*a*, the screw driving gear 39*c*, and the toner accommodating portion 30*a* are disposed in this order.

By employing the above-described constitution, it becomes possible to realize drive transmission to the screw member while suppressing the space of the main body-side driving means with respect to the longitudinal direction when the screw member receives the driving force from the printer main body A.

<Arrangement of Pump/Screw Driving Constitution in Short Direction>

An arrangement of the pump/screw driving constitution in the short direction will be described using FIGS. 13 and 21. As shown in FIG. 21, in the main body mounting attitude, a line connecting a rotational axis of the pump/screw drive input portion 39 and an opening center of the toner outlet port 31*a* (hereinafter, this line is referred to as a discharge inter-axial rectilinear line M) is substantially horizontal. Specifically, an angle q (discharge inter-axial angle) between the discharge inter-axial rectilinear line M and the horizontal direction (arrow X direction) is about +5°. For that reason, an element arrangement described below holds when the attitude of the toner container C is such an attitude that the discharge inter-axial rectilinear line M is horizontal.

In the main body mounting attitude of the toner container C, the center line 37*a*1 of the pump 37*a* is disposed between the pump/screw drive input portion 39 and the toner outlet port 31*a* with respect to the horizontal direction (arrow X). Further, the rotational axis of the screw driving gear 39*c* is disposed between the pump 37*a* and the toner outlet port 31*a* with respect to the horizontal direction. In other words, in the toner supplying portion 35, from the upstream side of the arrow X direction, the pump/screw drive input portion 39, the pump 37*a*, the screw driving gear 39*c*, and the toner outlet port 31*a* are disposed in a named order.

By employing this constitution, the pump 37*a* is provided in a position closer to the toner outlet port 31*a* than the pump screw drive portion 39 is. For this reason, compared with the case where the pump 37*a* is provided in a position more distant with respect to the horizontal direction of the toner container C from the toner outlet port 31*a* than the pump/screw input portion 39 is, the air conveying distance is a short distance, so that it becomes possible to convey the air with high power transmitting efficiency.

Incidentally, in this embodiment, the two drive input portions 38 and 39 through which drive can be independently inputted to the toner container C, so that even when the pump/screw drive input portion 39 is not driven, the stirring drive input portion 38 can be driven. That is, even when the toner supplying portion 30 does not supply the toner to the process cartridge B, a state in which the residual toner can be collected can be maintained by driving the first residual toner screw 44 and the second residual toner screw 45 of the residual toner collecting portion 40.

Further, drive input from the printer main body A to the toner container C can be integrated on one end side (first end side with respect to the rotational axis direction P1 of the stirring member) of the toner container C with respect to the longitudinal direction, so that the gear train of the printer main body A can be simplified. In this embodiment, the driving force inputted to the stirring drive input portion 38 on one side of the toner supplying portion 30 with respect to the longitudinal direction is transmitted to the other side of the toner supplying portion 30 with respect to the longitudinal direction by using the stirring and conveying unit 36 penetrating through the frame (supplying portion frame 31) of the toner supplying portion 35. That is, the toner container C is constituted so that the driving force received on the first end side of the toner accommodating portion 30*a* with respect to the rotational axis direction P1 of the stirring member is transmitted to a second end side of the toner accommodating portion 30*a* with respect to the rotational axis direction P1 through the stirring member. By this, it becomes possible to realize drive transmission to the first residual toner screw 44 positioned on the other side of the toner supplying portion 30 with respect to the longitudinal direction.

Incidentally, there is no need that the driving constitution of the toner container C is limited to the above-described constitution. For example, a constitution in which the first residual toner screw 44 is driven by providing another gear train on the other side of the printer main body A with respect to the longitudinal direction may be employed. However, by employing the driving constitution described in this embodiment, on the other side of the printer main body A with respect to the longitudinal direction, there is no need to increase the gear train for driving the residual toner collecting portion 40. Therefore, the residual toner can be accommodated in the toner container C without upsizing the toner container C and the printer main body A with respect to the axial direction of the photosensitive drum 11, and thus is preferable.

<Mounting and Demounting Method of Process Cartridge B and Toner Container C>

Next, a mounting and demounting method of the process cartridge B and the toner container C relative to the printer main body A will be described using parts (a) and (b) of FIG. 11 and parts (a) to (c) of FIG. 12. Parts (a) and (b) of FIG. 11 are perspective views for illustrating mounting of the discharge B and the toner container C into the printer main body A. Parts (a) to (c) of FIG. 12 are side views for illustrating the mounting of the process cartridge B and the toner container C into the printer main body A.

As shown in part (a) of FIG. 11, inside the printer main body A, a mounting portion, which is a space for mounting the process cartridge B and the toner container C, is provided. On an outer surface of the printer main body A, an openable door 107 rotatable (openable) about a rotational axis R5 relative to the printer main body A is provided. Parts (a) and (b) of FIG. 11 show a state in which the openable door 107 is open. The openable door 107 is opened, so that the mounting portion of the inside of the printer main body A is exposed to the outside of the printer main body A.

Further, the printer main body A includes guiding portions 108 and 109.

As shown in parts (a) and (b) of FIG. 9, at opposite end portions of the process cartridge B with respect to the longitudinal direction, upper bosses 93 and 94 and lower bosses 95 and 96 are provided. The stay 21 of the process cartridge B includes toner container positioning portions 21*a* and 21*b*.

The toner container C is provided with positioning bosses 50*a* and 60*a* and portions-to-be-guided 50*b* and 60*b* as shown in parts (a) and (b) of FIG. 13. The positioning bosses 50*a* and 60*a* are provided on opposite end sides with respect to the longitudinal direction of the toner container C, and the portions-to-be-guided 50*b* and 60*b* are also provided on the opposite end sides with respect to the longitudinal direction of the toner container C. Further, with respect to a mounting direction (arrow D direction in part (b) of FIG. 11), the portions-to-be-guided 50*b* and 60*b* are positioned on a side upstream of the positioning bosses 50*a* and 60*a*.

First, the process cartridge B is mounted in the printer main body A. As shown in part (a) of FIG. 11 and part (a) of FIG. 12, the process cartridge B is inserted in the arrow D direction while being guided by the guiding portions 108 and 109. At that time, movement of the process cartridge B is guided by sandwiching the guiding portion 108 by the upper boss 93 and the lower boss 95 (part (b) of FIG. 9) and by sandwiching the guiding portion 109 by the upper boss 94 and the lower boss 96. The direction (arrow D) in which the process cartridge B is moved along the guiding portions 108 and 109 is the mounting direction of the process cartridge B.

After the process cartridge B is mounted in the printer main body A, the toner container C is mounted into the printer main body A. As shown in part (b) of FIG. 11 and part (b) of FIG. 12, the portions-to-be-guided 50*b* and 60*b* of the toner container C are placed on the guiding portions 108 and 109 of the printer main body A, respectively, and are inserted in the arrow D direction. The direction in which the toner container C is moved along the guiding portions 108 and 109 is a mounting direction of the toner container C.

Part (c) of FIG. 12 shows a state in which the toner container Cis mounted to an insertion completion position. In this state, the positioning bosses 50*a* and 60*a* (parts (a) and (b) of FIG. 13) of the toner container C enter the toner container positioning portions 21*a* and 21*b* (part (b) of FIG. 9) of the process cartridge B, respectively. In this state, leading end portions of the portions-to-be-guided 50*b* and 60*b* with respect to the mounting direction are separated from the guiding portions 108 and 109, and trailing end portions of the portions-to-be-guided 50*b* and 60*b* with respect to the mounting direction contact the guiding portions 108 and 109. By this, the toner container C is positioned to the process cartridge B. Further, the trailing ends of the portions-to-be-guided 50*b* and 60*b* contact the guiding portions 108 and 109, so that a position of the toner container C in the printer main body A is determined.

When the openable door 107 is closed after the process cartridge B and the toner container C are mounted, the printer 1 is in a state in which image formation is capable of being executed.

When the toner container C and the process cartridge B are demounted (removed), the procedure is performed in a reverse order to the above-described order. That is, after the openable door 107 is opened, it is only required that first, the toner container C is pulled out in a direction opposite to the mounting direction (arrow D) and then the process cartridge B is pulled out in the direction opposite to the mounting direction (arrow D).

<Residual Toner Conveying Constitution on Inside of Cleaning Unit>

A residual toner conveying constitution on an inside of the cleaning unit 10 will be described using FIGS. 3, 4, and 14. FIG. 14 is a sectional view of the cleaning unit 10 in which a cross section of the cleaning unit 10 cut along a horizontal surface is viewed from above.

As shown in FIGS. 3, 4, and 14, the cleaning unit 10 includes the first residual toner conveying passage 10*b* extending substantially parallel to the direction (drum axis direction) of the rotational axis of the photosensitive drum 11 and the second residual toner conveying passage 10*c* extending in a direction substantially perpendicular to the drum axis direction. In the first residual toner conveying passage 10*b*, a first residual toner conveying member 70 is provided, and in the second residual toner conveying passage 10*c*, a second residual toner conveying member 71 is provided. The second residual toner conveying passage 10*c* and the second residual toner conveying member 71 are disposed inside opposite end portions of the cleaning blade 17 with respect to the drum axis direction (FIG. 14).

As described above, the residual toner on the photosensitive drum 11 is collected in the residual toner primary accommodating portion 10*a* by the cleaning blade 17. When the residual toner primary accommodating portion 10*a* is filled with the residual toner, the residual toner reaches the first residual toner conveying passage 10*b*. The residual toner in the first residual toner conveying passage 10*b* is conveyed from one side toward the other side by a helical portion 70*a* provided in the first residual toner conveying member 70, and then reaches the second residual toner conveying passage 10*c*. The residual toner in the second residual toner conveying passage 10*c* is conveyed by the helical portion 71*a* of the second residual toner conveying member 71 in a direction perpendicular to the drum axis direction and toward above the cleaning blade 17. Then, the residual toner conveyed to an end portion of the second residual toner conveying member 71 is discharged from a residual toner outlet port 72 (FIG. 4) to the residual toner inlet port 42*a* (FIG. 13) of the residual toner collecting portion 40.

The residual toner outlet port 72 is an opening provided in the cleaning unit 10 for permitting discharge of the residual toner from the process cartridge B. The residual toner inlet port 42*a* is an opening provided in the residual toner collecting portion 40 of the toner container C in order to receive the residual toner discharged from the process cartridge B.

<Driving Constitution of Residual Toner Conveying Member>

A driving constitution of the first residual toner conveying member 70 and the second residual toner conveying member 71 will be described using FIG. 15. FIG. 15 is a perspective view of the process cartridge B, showing the driving constitution of the residual toner conveying members. In FIG. 15, for explanation, the side cover 7 and the bearing member 5 of the process cartridge B are omitted from illustration.

As shown in FIG. 15, the cleaning unit 10 includes a driving gear 70*b* for transmitting the drive to the first residual toner conveying member 70 and a bevel gear 71*b* for transmitting the drive to the second residual toner conveying member 71. To the driving gear 70, the drive is transmitted through an idler gear train 601 from a developing coupling 155 provided coaxially with the swing axis 8. Incidentally, the developing coupling 155 is (one of) input member(s) through which the drive is transmitted from the printer main body A to the process cartridge B.

To the bevel gear 71*b*, the drive is transmitted from the driving gear 70*b* through the idler gear 602 and a penetration (insertion) shaft 75. The penetration shaft is an axial member penetrating through the cleaning unit in a drum axis direction. At one end of the penetration shaft 75, a gear 75*b* engageable with the idler gear 602 is provided, and at the other end of the penetration shaft 75, a bevel gear 75*a* engageable with the bevel gear 71*b* is provided. Thus, by the drive transmission from the driving gear 70*b* through the idler gear 602 and the penetration shaft 75, the first residual toner conveying member 70 and the second residual toner conveying member 71 are driven in interrelation with each other, so that the residual toner can be conveyed.

Incidentally, the bevel gear 71*b* and the bevel gear 75*a* may be replaced with a screw gear or a worm gear. Further, in this embodiment, rotation numbers of the first residual toner conveying member 70 and the second residual toner conveying member 71 are the same, but in order to enhance conveying efficiency, the rotation number of the second residual toner conveying member 71 may be made more than the rotation number of the first residual toner conveying member 70.

<Drive Constitution of Residual Toner Collecting Portion>

Figure 1:
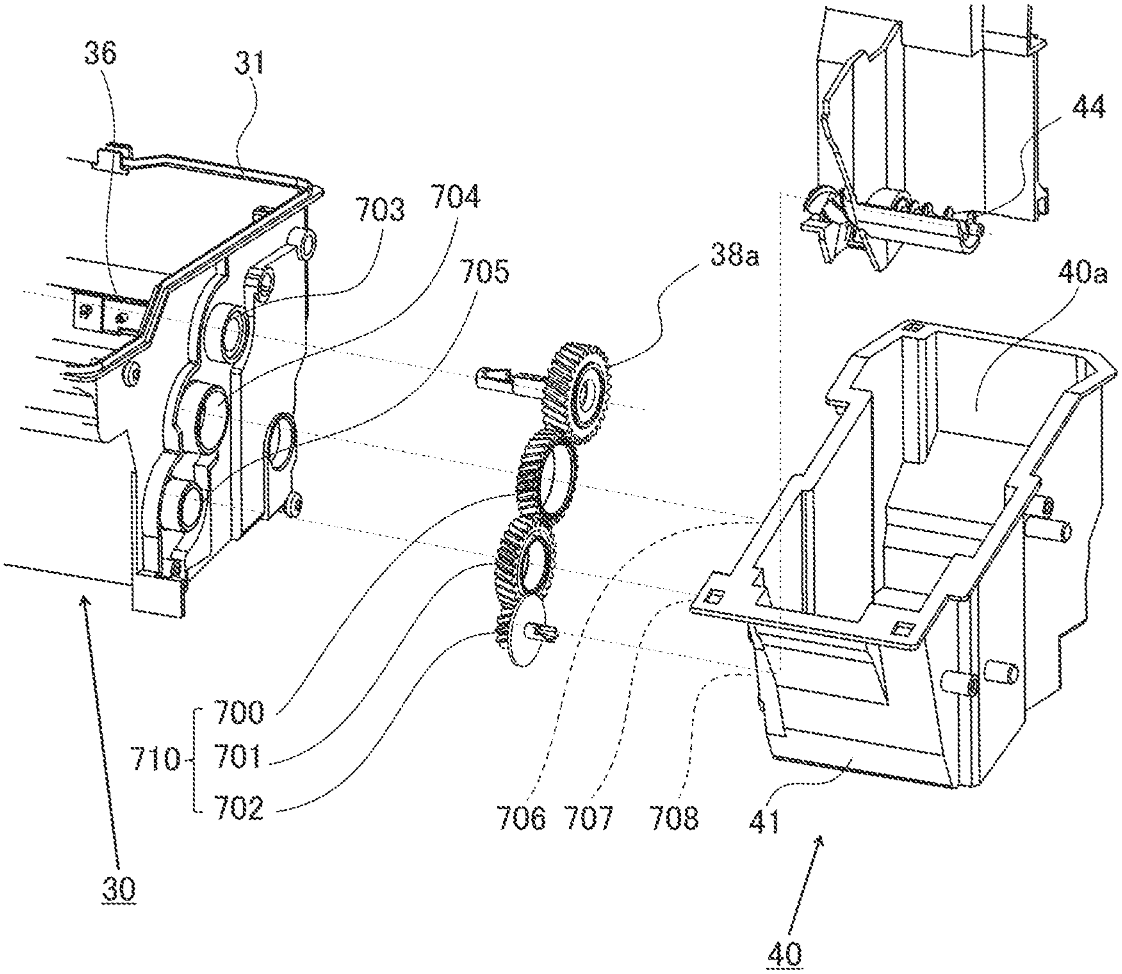
FIG. 1 is an exploded view of a part of a toner container according to an embodiment.

Details of a driving constitution of the residual toner collecting portion will be described using FIGS. 1, 17, 18, and 19. FIGS. 1 and 17 are exploded perspective views showing a drive transmission mechanism (residual toner driving train) by the stirring non-driving-side gear 38*a* and the gear train 710. FIG. 18 is a detailed view of a residual toner driving train. FIG. 19 is a front view of a toner container according to a comparison example.

As shown in FIGS. 1, 17, and 18, the stirring non-driving-side gear 38*a* is shaft-supported rotatably by a shaft-supporting portion 703 provided on the supplying portion frame 31. The shaft-supporting portion 703 is provided coaxially with the stirring and conveying unit 36. The stirring non-driving-side gear 38*a* rotates about a rotational axis Ra36 integrally with the stirring and conveying unit 36 on the other end side (non-driving side) of the stirring and conveying unit 36 with respect to the longitudinal direction, so that the driving force is transmitted to the gear train 710. The gear train 710 is constituted by a first idler gear 700, a second idler gear 701, and a screw gear 702. The contact gear 702 is connected to a first residual toner screw 44 so as to rotate about a rotational axis Ra44 integrally with the first residual toner screw 44.

The screw gear 702 functions as an input gear for inputting the driving force to the first residual toner screw 44 as a residual toner conveying means. Incidentally, the screw gear 702 is provided coaxially with the first residual toner screw 44, and therefore, is positioned below the residual toner inlet port 42*a* of the residual toner collecting portion 40. Further, the screw gear 702 is positioned below the stirring non-driving-side gear 38*a*. Thus, the driving force is transmitted by the gear train 710 to the first residual toner screw 44 disposed in a position lower than the stirring non-driving-side gear 38*a* and the residual toner inlet port 42*a*, so that the residual toner can be efficiently charged into the residual toner collecting portion 40.

Incidentally, as a drive transmitting portion, for example, a belt transmitting mechanism may be used in place of the gear train 710.

The supplying portion frame 31 is provided with a first shaft supporting portion 704 shaft-supporting the first idler gear 700 and a second shaft supporting portion 705 shaft-supporting the second idler gear 701. The accommodating portion frame 41 is provided with a third shaft supporting portion 706 shaft-supporting the first idler gear 700 and a fourth shaft supporting portion 707 shaft-supporting the second idler gear 701.

The first idler gear 700 is supported at both ends by the first shaft supporting portion 704 (first supporting portion) and the third shaft supporting portion 706 (second supporting portion). The second idler gear 701 is supported at both ends by the second shaft supporting portion 705 (third supporting portion) and the fourth shaft supporting portion 707 (fourth supporting portion).

The screw gear 702 is rotatably shaft-supported by a shaft supporting portion 708 provided on the accommodating portion frame 41. The shaft supporting portion 708 is provided coaxially with the first residual toner screw 44. The screw gear 702 rotationally drives the first residual toner screw 44 by receiving a rotational driving force from the stirring non-driving-side gear 38*a* through the first idler gear 700 and the second idler gear 701.

As shown in FIG. 18, the stirring non-driving-side gear 38*a* and each of gears of the gear train 710 in this embodiment are helical gears. For this reason, by the drive transmission, the stirring non-driving-side gear 38*a* and the gear train 710 receive a thrust force in the longitudinal direction, and contact the supplying portion frame 31 and the accommodating portion frame 41, respectively. Accordingly, when compared with the case where the stirring non-driving-side gear 38*a* and the gear train 710 are constituted by spur gears, a dimension tolerance with respect to the longitudinal direction can be decreased for stably maintaining a position of the gear train with respect to the longitudinal direction. By this, it becomes possible to downsize the toner container C with respect to the longitudinal direction.

In this embodiment, a constitution in which the stirring non-driving-side gear 38*a* and the gear train 710 are disposed between the supplying portion frame 31 and the accommodating portion frame 41 with respect to the longitudinal direction and in which the residual toner collecting portion 40 is driven by the driving force inputted to the supplying portion frame 31 on a side opposite from the accommodating portion frame 41 was employed. For this reason, drive input to the toner container C including the toner supply to the process cartridge B and the residual toner collection from the process cartridge B can be completed.

Description will be made specifically using the comparison example of FIG. 19. In this comparison example, the drive of the toner container C on the residual toner collecting portion 40 side is inputted to a drive input portion 711 provided on the other end side (the non-driving side of this embodiment described above) of the toner container C with respect to the longitudinal direction. That is, in this comparison example, on one end side and the other end side of the toner container C with respect to the longitudinal direction, a drive input portion (the above-described stirring drive input portion 38 and the above-described pump/screw drive input portion 39) to the toner supplying portion 30 and the drive input portion 711 to the residual toner collecting portion are disposed, respectively. In this constitution, corresponding to projection of the drive input portion 711 on the other end side with respect to the longitudinal direction, a size of the toner container C with respect to the longitudinal direction becomes large. Further, a constitution for inputting the drive to the drive portion 711 for the residual toner collecting portion 4 is provided on the printer main body A side, so that the constitution leads to upsizing of the printer main body A.

On the other hand, according to this embodiment described above, the drive input to the toner container C is completed on one end side with respect to the longitudinal direction, so that it becomes possible to downsize the toner container C and the printer main body A with respect to the longitudinal direction. Further, in the case where the size of the toner container C of the comparison example with respect to the longitudinal direction is caused to coincide with a size of the toner container C of this embodiment, a space with respect to the longitudinal direction is effectively utilized, so that it becomes possible to realize a large volume of the toner accommodating portion 30*a* and the residual toner accommodating portion 40*a*.

Further, the first residual toner screw 44 is driven by utilizing the driving force of the stirring and conveying unit 36, and therefore, a constitution in which a rotation driving shaft as a separate component part is penetrated from the supplying portion frame 31 and rotation drive is transmitted to the first residual toner screw 44 is not needed. For that reason, compared with a constitution in which the stirring and conveying unit 36 and the rotation drive shaft as the separate component part are arranged in a cross-sectional direction of the toner container C, downsizing of the toner container C with respect to the cross-sectional direction can be realized. The cross-sectional direction is an in-plane direction in an imaginary flat plane perpendicular to the longitudinal direction of the toner container C. Further, the toner accommodating portion 30*a* and the residual toner accommodating portion 40*a* can be increased in volume by effectively utilizing a space with respect to the cross-sectional direction.

Further, in this embodiment, the first idler gear 700 and the second idler gear 701 are supported at both ends thereof by the supplying portion frame 31 and the accommodating portion frame 41, respectively. For this reason, compared with a constitution in which each of the gears is supported at one end, falling of each gear due to torque transmission can be reduced. That is, even when a face width of each gear is narrowed, transmission efficiency is maintained. For that reason, by narrowing the face width of each gear, it becomes possible to downsize the toner container C with respect to the longitudinal direction while maintaining transmission efficiency of the gear train. Further, the toner accommodating portion 30*a* and the residual toner accommodating portion 40*a* can be increased in volume by effectively utilizing the space with respect to the longitudinal direction.

Another Embodiment

In the above-described embodiment, the image forming apparatus with the constitution in which the toner container C is mounted after the process cartridge B is mounted in the printer main body A was described. The present invention is not limited thereto. For example, a constitution in which a unit having a function of the process cartridge B is incorporated in the printer main body A in an undetachably mountable manner and in which the toner container C is detachably mounted in the printer main body A provided with the unit can be employed.

SUMMARY OF THE PRESENT INVENTION

The present invention encompasses at least the following constitutions.

(Constitution A)

A toner container comprising:

- a first chamber configured to accommodate toner and provided with an outlet port through which the toner is discharged outside of the toner container;
- a second chamber provided with an inlet port and configured to accommodate toner to be received from an outside of the toner container through the inlet port;
- a stirring member configured to stir the toner accommodated in the first chamber and rotatable about a first rotational axis;
- an air supply unit configured to supply air for discharging the toner accommodated in the first chamber to an outside of the toner container through the outlet port; and
- a driving force receiving portion rotatable about a second rotational axis by receiving a driving force from the outside and for driving the air supply unit,
- wherein in a direction of the first rotational axis, the driving force receiving portion, the air supply unit, and the outlet port are provided in this order, and
- wherein in a cross section perpendicular to the first rotational axis, with respect to an imaginary rectilinear line passing through the second rotational axis and the outlet port, a position of a center axis of the air supply unit is positioned between a position of the second rotational axis and a position of the outlet port.

(Constitution A1)

The toner container of the constitution A further comprising:

- a screw provided in the first chamber and for conveying the toner toward the outlet port by being rotated; and
- a driving gear for transmitting a driving force from the driving force receiving portion to the screw and mounted on the screw at a longitudinal end portion,
- wherein the air supply unit, the driving gear, and the first chamber are disposed in this order in the direction of the first rotational axis.

(Constitution A2)

The toner container of the constitution A1, wherein in a cross section perpendicular to the first rotational axis, with respect to the imaginary rectilinear line, a position of a third rotational axis of the driving gear is positioned between the position of the center axis of the air supply unit and the outlet port.

(Constitution B)

A toner container detachably mountable to a main assembly of an image forming apparatus, wherein the main assembly includes a photosensitive drum and a developing unit for accommodating toner supplied to the photosensitive drum, the toner container comprising:

- a first chamber configured to accommodate toner for being supplied to the developing unit and provided with an outlet port for permitting discharge of the toner;
- a second chamber configured to accommodate the toner collected from the photosensitive drum and provided with an inlet port for permitting reception of the toner;
- a stirring member configured to stir the toner accommodated in the first chamber and rotatable about a first rotational axis;
- an air supply unit configured to supply air for discharging the toner accommodated in the first chamber to an outside of the toner container through the outlet port; and
- a driving force receiving portion for driving the air supply unit by receiving a driving force from the main assembly,
- wherein in a direction of the first rotational axis, the driving force receiving portion, the air supply unit, and the outlet port are provided in this order, and
- wherein in a cross section perpendicular to a direction of the first rotational axis, with respect to an imaginary rectilinear line passing through a second rotational axis of the driving force receiving portion and the outlet port, a position of a center axis of the air supply unit is positioned between a position of the second rotational axis and a position of the outlet port.

(Constitution C)

A toner container comprising:

a first chamber configured to accommodate toner and provided with an outlet port through which the toner is discharged outside of the toner container;

a second chamber provided with an inlet port and configured to accommodate toner to be received from an outside of the toner container through the inlet port;

a first toner conveying means provided in the first chamber and for conveying the toner by being rotated about a rotational axis, the first toner conveying means penetrating through the first chamber in a direction of the rotational axis;

a second toner conveying provided in the second chamber and for conveying the toner;

a driving force receiving portion for driving the first toner conveying means by receiving a driving force from the outside; and a drive transmitting portion for transmitting the driving force from the first toner conveying means to the second toner conveying means, wherein the first chamber and the second chamber are aligned in a direction of the rotational axis, wherein in the direction of the rotational axis, the driving force receiving portion is provided on the first chamber on a side opposite from a side where the second chamber is provided, and wherein in the direction of the rotational axis, the drive transmitting portion is provided between the first chamber and the second chamber.

(Constitution C1)

The toner container of the constitution C further comprising:

a screw provided in the first chamber, the screw conveying the toner toward the outlet port in a direction along the direction of the rotational axis, wherein the first toner conveying means conveys the toner toward the screw in a direction crossing the direction of the rotational axis.

(Constitution C2)

The toner container of the constitution C further comprising:

a second driving force receiving portion for driving the screw by inputting the driving force from the outside thereto in a case that the driving force receiving portion is a first driving force receiving portion.

(Constitution C3)

The toner container of the constitution C, wherein as viewed in the direction of the rotational axis, a position of a rotational axis of the first toner conveying means and a position of a rotational axis of the second toner conveying means are different from each other, and wherein the drive transmitting portion is a gear train for forming a drive transmitting passage between the first toner conveying means and the second toner conveying means.

(Constitution C4)

The toner container of the constitution C, wherein at least a part of the gear train is a helical gear.

(Constitution C5)

The toner container of the constitution C3, wherein at least a part of the gear train is supported by a first supporting portion provided on a surface of the first chamber on the second chamber side in the direction of the rotational axis and by a second supporting portion provided on a surface of the second chamber on the first chamber side in the direction of the rotational axis.

(Constitution C6)

The toner container of the constitution C3, wherein the gear train includes an input gear rotatable about the rotational axis of the second toner conveying means integrally with the second toner conveying means, and the input gear is positioned below the inlet port when the toner container assumes an attitude when mounted in the main assembly.

(Constitution D)

A toner container detachably mountable to a main assembly of an image forming apparatus, wherein the main assembly includes a photosensitive drum and a developing unit for accommodating toner supplied to the photosensitive drum, the toner container comprising:

a first chamber configured to accommodate toner for being supplied to the developing unit and provided with an outlet port for permitting discharge of the toner;

a second chamber configured to accommodate the toner collected from the photosensitive drum and provided with an inlet port for permitting reception of the toner;

a first toner conveying means provided in the first chamber and for conveying the toner by being rotated about a rotational axis, the first toner conveying means penetrating through the first chamber in a direction of the rotational axis;

a second toner conveying provided in the second chamber and for conveying the toner;

a driving force receiving portion for receiving, from the main assembly, a driving force for driving the first toner conveying means; and a driving force transmitting portion for transmitting the driving force from the first toner conveying means to the second toner conveying means, wherein the first chamber and the second chamber are aligned in a direction of the rotational axis, wherein in the direction of the rotational axis, the driving force receiving portion is provided on the first chamber on a side opposite from a side where the second chamber is provided, and wherein in the direction of the rotational axis, the driving force transmitting portion is provided between the first chamber and the second chamber.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102266 filed on Jun. 24, 2022, which is hereby incorporated by reference herein in its entirety.

What is claimed is:

1. A toner container comprising:

a first chamber configured to accommodate toner and provided with an outlet port through which the toner is discharged outside of the toner container;

a second chamber provided with an inlet port and configured to accommodate toner to be received from an outside of the toner container through the inlet port;

a stirring member configured to stir the toner accommodated in the first chamber and to rotate about a rotational axis; and an air supply unit configured to supply air for discharging the toner accommodated in the first chamber to an outside of the toner container through the outlet port, wherein the air supply unit, the first chamber, and the second chamber are aligned in this order in a direction of the rotational axis.

2. The toner container according to claim 1, wherein the outlet port is provided at a position closer to the air supply unit than to the second chamber in the direction of the rotational axis.

3. The toner container according to claim 1, further comprising a driving force receiving member configured to receive a driving force for driving the stirring member from the outside of the toner container, wherein the air supply unit is provided between the outlet port and the driving force receiving member in a direction from the driving force receiving member toward the outlet port and perpendicular to the rotational axis.

4. The toner container according to claim 1, further comprising a driving force receiving member configured to receive a driving force for driving the air supply unit from the outside of the toner container, wherein the air supply unit is provided between the outlet port and the driving force receiving member in a direction from the driving force receiving member toward the outlet port and perpendicular to the rotational axis.

5. The toner container according to claim 1, wherein a width of the first chamber in the direction of the rotational axis is wider than a width of the second chamber.

6. The toner container according to claim 1, further comprising a conveying member which is rotatable about a second rotational axis extending in a direction crossing the direction of the rotational axis of the stirring member and which is configured to convey toner to be accommodated in the second chamber in the direction of the second rotational axis.

7. The toner container according to claim 1, wherein the first chamber is a flow passage extending from the air supply unit toward the outlet port in the direction of the rotational axis and guiding the air from the air supply unit to the outlet port.

8. The toner container according to claim 1, further comprising a screw provided in the first chamber and configured to convey the toner toward the outlet port by being rotated, wherein in case that in a cross section perpendicular to the direction of the rotational axis, the toner container assumes an attitude such that an imaginary rectilinear passing through the rotational axis of the stirring member and a rotational axis of the screw is horizontal, the outlet port is positioned above a bottom of the first chamber.

9. The toner container according to claim 8, wherein the stirring member includes a shaft portion rotatable by transmitting thereto a driving force and a stirring portion which projects from the shaft portion in a radial direction and which is configured to stir and convey the toner by being rotated together with the shaft portion, and wherein the stirring portion is constituted so as to scoop the toner from the bottom of the first chamber toward the screw when the stirring member is rotated.

10. The toner container according to claim 8, wherein when the toner container assumes an attitude in a case that the toner container is mounted in a main assembly of an image forming apparatus, in the cross section, an angle of the imaginary rectilinear line relative to a horizontal direction falls within ±5°.

11. The toner container according to claim 4, further comprising a screw provided in the first chamber and configured to convey the toner toward the outlet port by being rotated, wherein when the toner container assumes an attitude when the toner container is mounted in a main assembly of an image forming apparatus, in a cross section perpendicular to the direction of the rotational axis, the outlet port is positioned above a bottom of the first chamber.

12. The toner container according to claim 1, further comprising a screw provided in the first chamber and configured to convey the toner toward the outlet port by being rotated, wherein when the toner container assumes an attitude when the toner container is mounted in a main assembly of an image forming apparatus, in a cross section perpendicular to the direction of the rotational axis, a center axis of the air supply unit is positioned above the outlet port.

13. The toner container according to claim 1, further comprising a drive input portion to which a driving force is inputted from the outside of the toner container so as to drive the air supply unit, wherein the drive input portion, the air supply unit, and the outlet port are disposed in this order in the direction of the rotational axis.

14. The toner container according to claim 13, wherein in a cross section perpendicular to the direction of the rotational axis, a rotational axis of the drive input portion, a center axis of the air supply unit, and the outlet port are disposed in this order in a direction of an imaginary rectilinear line connecting a rotational axis of the drive input portion and the outlet port.

15. The toner container according to claim 1, wherein the air supply unit is a pump configured to supply the air by changing an inside volume thereof by being expanded and contracted.

16. The toner container according to claim 15, wherein an expansion and contraction direction in which the pump is expanded and contracted is the direction of the rotational axis.

17. The toner container according to claim 16, further comprising a cam mechanism including a rotatable cam, wherein rotation of the cam is converted into expansion and contraction motion of the pump.

18. The toner container according to claim 12, wherein the air supply unit includes a pump configured to supply the air by changing an inside volume thereof by being expanded and contracted.

19. The toner container according to claim 18, wherein an expansion and contraction direction in which the pump is expanded and contracted is the direction of the rotational axis.

20. The toner container according to claim 19, wherein the air supply unit is a cam mechanism including a cam rotatable about the center axis, and the pump is expanded and contracted by rotation of the cam about the center axis.

21. A toner container detachably mountable to a main assembly of an image forming apparatus in which the main assembly includes a photosensitive drum and a developing unit for accommodating toner supplied to the photosensitive drum, the toner container comprising:

a first chamber configured to accommodate toner for being supplied to the developing unit;

a second chamber configured to accommodate toner collected from the photosensitive drum;

a stirring member configured to stir the toner accommodated in the first chamber by being rotated about a rotational axis; and an air supply unit configured to supply air for discharging the toner in the first chamber to an outside of the toner container, wherein the air supply unit, the first chamber, and the second chamber are aligned in this order in a direction of the rotational axis.

* * * * *